(12) United States Patent
Oikawa et al.

(10) Patent No.: US 8,754,976 B2
(45) Date of Patent: Jun. 17, 2014

(54) IMAGE-CAPTURING APPARATUS INCLUDING IMAGE SENSOR UTILIZING PAIRS OF FOCUS DETECTION PIXELS

(75) Inventors: Makoto Oikawa, Yokohama (JP); Akihiko Nagano, Ichihara (JP); Yasuo Suda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 12/999,735

(22) PCT Filed: Jul. 8, 2009

(86) PCT No.: PCT/JP2009/062766
§ 371 (c)(1), (2), (4) Date: Dec. 17, 2010

(87) PCT Pub. No.: WO2010/005104
PCT Pub. Date: Jan. 14, 2010

(65) Prior Publication Data
US 2011/0096211 A1    Apr. 28, 2011

(30) Foreign Application Priority Data

Jul. 9, 2008 (JP) .................... 2008-179461

(51) Int. Cl.
*H04N 5/232* (2006.01)
(52) U.S. Cl.
USPC .......................... 348/345; 348/273; 348/294
(58) Field of Classification Search
USPC ........................................ 348/273, 294, 345
See application file for complete search history.

(56) References Cited

U.S. PATENT DOCUMENTS

| | | | |
|---|---|---|---|
| 5,583,076 A | 12/1996 | Yoshizawa et al. | 437/211 |
| 5,912,504 A | 6/1999 | Yoshizawa et al. | 257/730 |
| 6,597,868 B2 | 7/2003 | Suda | 396/111 |
| 6,819,360 B1 | 11/2004 | Ide et al. | 348/340 |
| 6,829,008 B1 | 12/2004 | Kondo et al. | 348/302 |
| 7,060,961 B2 | 6/2006 | Dobashi et al. | 250/216 |
| 7,245,324 B2 | 7/2007 | Namazue et al. | 348/340 |
| 7,586,072 B2 | 9/2009 | Kusaka | |
| 2007/0237512 A1* | 10/2007 | Kusaka | 396/111 |
| 2008/0074534 A1* | 3/2008 | Kusaka | 348/364 |
| 2008/0084483 A1* | 4/2008 | Kusaka | 348/222.1 |
| 2008/0143858 A1* | 6/2008 | Kusaka | 348/294 |
| 2008/0240701 A1* | 10/2008 | Kusaka | 396/104 |

FOREIGN PATENT DOCUMENTS

| | | | |
|---|---|---|---|
| JP | 2000-156823 A | 6/2000 | |
| JP | 2001-305415 A | 10/2001 | |
| JP | 2007-127746 A | 5/2007 | |
| JP | 2007-155929 A | 6/2007 | |
| JP | 2007-158597 A | 6/2007 | |

(Continued)

*Primary Examiner* — Usman Khan
(74) *Attorney, Agent, or Firm* — Fitzpatrick, Cella, Harper & Scinto

(57) ABSTRACT

In an image sensor having a plurality of pixels which photoelectrically convert a subject image, a plurality of pairs of focus detection pixels including first focus detection pixels ($S_{HA}$) and second focus detection pixels ($S_{HB}$) are arranged while being distributed. The layouts of the first focus detection pixel ($S_{HA}$) and the second focus detection pixel ($S_{HB}$) are switched in pairs of focus detection pixels adjacent in the focus detection direction. Focus detection is performed using image waveforms obtained from the first focus detection pixel ($S_{HA}$) and the second focus detection pixel ($S_{HB}$) whose layouts are switched. This reduces focus detection errors generated when the pixels included in the pairs of focus detection pixels receive light fluxes from different portions of the subject.

4 Claims, 22 Drawing Sheets

(56) References Cited

FOREIGN PATENT DOCUMENTS

| JP | 2007-282109 A | 10/2007 |
|----|---------------|---------|
| JP | 2008-017116 A | 1/2008  |
| JP | 2008-085738 A | 4/2008  |
| JP | 2008-122835 A | 5/2008  |
| JP | 2008-147821 A | 6/2008  |
| JP | 2008-211631 A | 9/2008  |
| JP | 2009-015164 A | 1/2009  |
| JP | 2000-292686 A | 10/2010 |

* cited by examiner

FIG. 6B
FIG. 6A
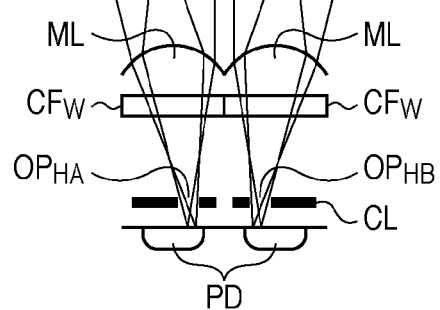
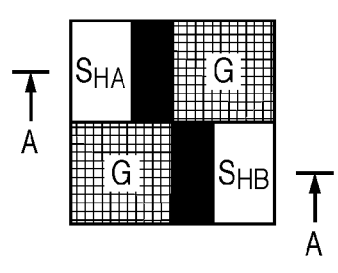

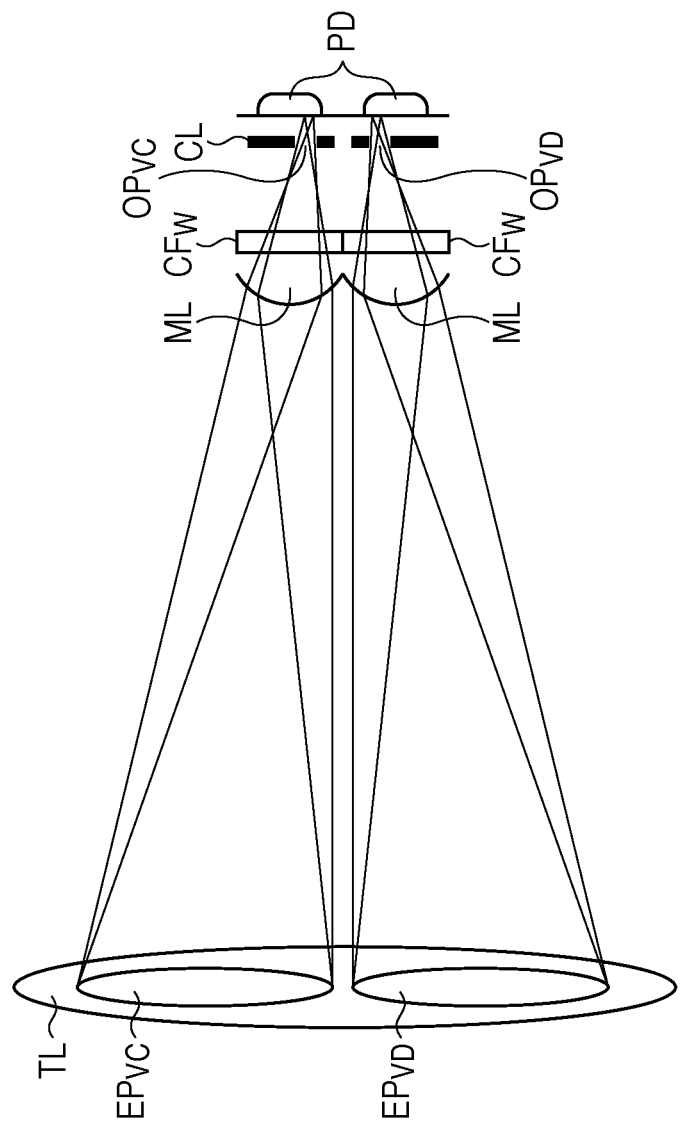
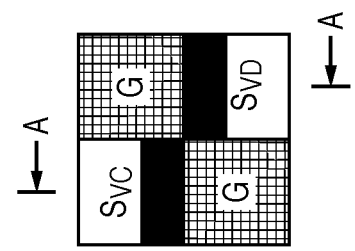

IMAGE-CAPTURING APPARATUS INCLUDING IMAGE SENSOR UTILIZING PAIRS OF FOCUS DETECTION PIXELS

TECHNICAL FIELD

The present invention relates to a focus detection method in an image sensor capable of capturing a still image and/or a moving image using a number of photoelectric conversion elements which are two-dimensionally arrayed, and in an image-capturing apparatus using the image sensor.

BACKGROUND ART

Conventionally, Japanese Patent Laid-Open Nos. 2000-292686 and 2001-305415 disclose techniques of imparting a phase-difference detection function to an image sensor to implement high-speed phase-difference detection type AF without using a dedicated AF sensor.

In Japanese Patent Laid-Open No. 2000-292686, each of the light-receiving units of some pixels in an image sensor is divided into two parts to impart a pupil division function, thereby forming focus detection pixels. Phase-difference detection type AF is implemented using the focus detection pixels arranged at a predetermined interval. Note that the focus detection pixels incapable of capturing an image are handled as defective pixels, and image information corresponding to them is generated by interpolating neighboring image-capturing pixel information.

Japanese Patent Laid-Open No. 2001-305415 discloses generating image information of focus detection pixels by adding up outputs from the two light-receiving units of each focus detection pixel, instead of interpolating neighboring image-capturing pixel information.

However, since the focus detection pixel in the Japanese Patent Laid-Open Nos. 2000-292686 and 2001-305415 has a light-receiving unit that is divided in two, the light-receiving efficiency lowers, resulting in a narrower dynamic range and a lower S/N ratio.

Japanese Patent Laid-Open No. 2000-156823 discloses a technique which uses some pairs of pixels in an image sensor as focus detection pixels by decentering the sensitive regions of light-receiving units in opposite directions with respect to the optical axes of on-chip microlenses. Phase-difference detection type AF is performed based on a pair of AF waveforms obtained from such a pair of focus detection pixels. In Japanese Patent Laid-Open No. 2000-156823, the image information of the focus detection pixels is generated by interpolating neighboring image-capturing pixel information, as in Japanese Patent Laid-Open No. 2000-292686.

Japanese Patent Laid-Open No. 2000-156823 can suppress degradation in the light-receiving efficiency of the focus detection pixels, but has the following problems.

Since each pair of focus detection pixels whose light-receiving units have sensitive regions decentered in the opposite directions includes different pixels, the individual pixels receive light fluxes from different portions of a subject image. Hence, image waveforms having a phase shift corresponding to the interval between the pixels included in the pair of focus detection pixels are obtained. The shift amount is not constant and is hard to correct because it changes depending on the pattern of the subject. This causes a focus detection error. Additionally, in Japanese Patent Laid-Open No. 2000-156823, since two pixels that form a pair of focus detection pixels are spaced apart from each other, a focus detection error occurs at higher probability.

DISCLOSURE OF INVENTION

The present invention has been made in consideration of the problems of the prior arts, and provides an image-capturing apparatus capable of reducing focus detection errors which are generated when pixels included in a pair of focus detection pixels receive light fluxes from different portions of a subject.

According to an aspect of the present invention, there is provided an image-capturing apparatus comprising: an image sensor including a plurality of pixels which photoelectrically convert a subject image, in which a plurality of pairs of focus detection pixels to detect focus of a lens which forms the subject image by phase difference detection are arranged in the plurality of pixels at a predetermined pitch, each pair of focus detection pixels consists of a first focus detection pixel and a second focus detection pixel; and detection means for detecting, based on a phase difference between a first image waveform and a second image waveform obtained from the first focus detection pixels and the second focus detection pixels of the plurality of pairs of focus detection pixels, respectively, a focusing status of the lens, wherein in the two adjacent pairs of focus detection pixels in a direction perpendicular to the phase difference detection, layouts of the first focus detection pixel and the second focus detection pixel are switched, and the detection means detects the focusing status of the lens using the first image waveform and the second image waveform obtained from the plurality of pairs of focus detection pixels in which the layouts of the first focus detection pixels and the second focus detection pixels are switched.

Further features of the present invention will become apparent from the following description of exemplary embodiments with reference to the attached drawings.

BRIEF DESCRIPTION OF DRAWINGS

FIGS. 6A and 6B are views showing an example of the layout and structure of focus detection pixels (AF pixels) for dividing the pupil in the horizontal direction (lateral direction) of a photographing lens according to the first embodiment of the present invention;

FIGS. 7A and 7B are views showing an example of the layout and structure of focus detection pixels for dividing the pupil in the vertical direction (longitudinal direction) of the photographing lens according to the first embodiment of the present invention;

BEST MODE FOR CARRYING OUT THE INVENTION

Exemplary embodiments of the present invention will now be described in detail in accordance with the accompanying drawings.

First Embodiment

Figure 1:
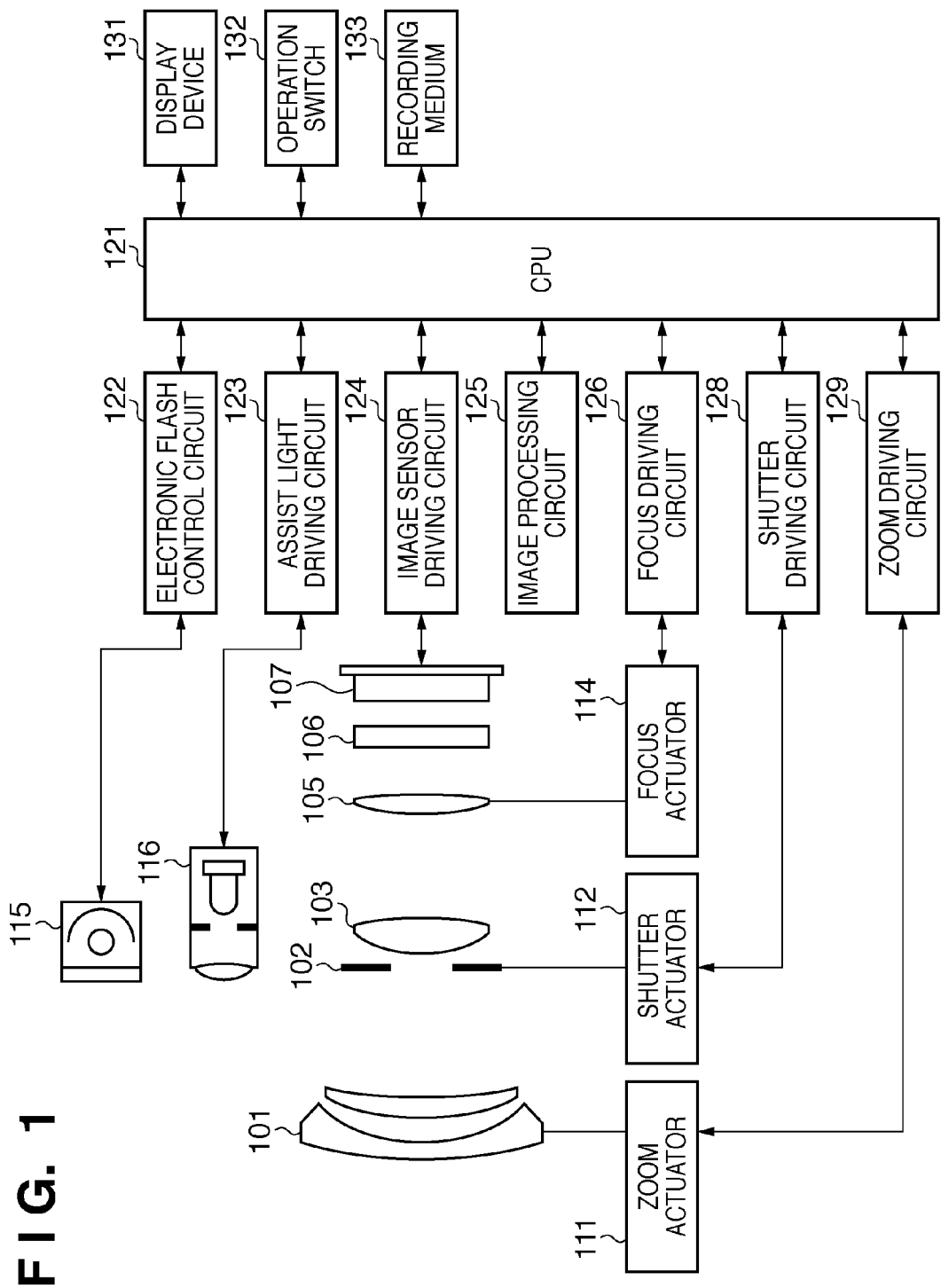
FIG. 1 is a view showing an example of the arrangement of a digital camera exemplified as an image-capturing apparatus according to the first embodiment of the present invention.

FIG. 1 is a view showing an example of the arrangement of a digital camera exemplified as an image-capturing apparatus according to the first embodiment of the present invention.

A first lens group 101 is placed at the front end of a photographing optical system (imaging optical system) and held to be movable in the optical axis direction. A shutter 102 functions not only as a shutter for controlling the exposure time in shooting a still image but also as an aperture which controls the light amount in shooting by adjusting the opening diameter. A second lens group 103 placed on the rear side (image sensor side) of the shutter 102 can move in the optical axis direction integrally with the shutter 102 so as to implement a zoom function together with the first lens group 101.

A third lens group 105 serves as a focus lens and is movable in the optical axis direction. An optical low-pass filter 106 is placed in front of an image sensor 107 to reduce false colors and moiré in a captured image. The image sensor 107 includes, for example, a CMOS sensor and its peripheral circuits. In this embodiment, the image sensor 107 is a two-dimensional single multicolor filtered image sensor in which m×n light-receiving elements are two-dimensionally arrayed in the horizontal and vertical direction, and on-chip primary color mosaic filters in a Bayer matrix are formed on them. The color filters limit the wavelength of transmission light which becomes incident on the light-receiving element of each pixel.

A zoom actuator 111 makes a cam cylinder (not shown) pivot to drive the first lens group 101 and/or the second lens group 103 in the optical axis direction under the control of a zoom driving circuit 129. A shutter actuator 112 drives the shutter 102 to a predetermined opening diameter at a predetermined open/close timing under the control of a shutter driving circuit 128.

A focus actuator 114 drives the third lens group 105 in the optical axis direction under the control of a focus driving circuit 126.

An electronic flash 115 is a flash illumination device using a xenon tube. It may be an illumination device including an LED that continuously emits light. An AF assist light output unit 116 projects a mask image having a predetermined opening pattern onto the field, thereby assisting focus detection in shooting in a dark place or for a low-contrast subject.

A CPU 121 includes an arithmetic unit, ROM, RAM, A/D converter, D/A converter, and communication interface circuit (none are shown), and controls the operation of the entire digital camera. The CPU 121 executes programs stored in the ROM to control various kinds of circuits, thereby implementing the functions of the digital camera such as AF, AE, image processing, and recording.

An electronic flash control circuit 122 controls lighting of the electronic flash 115 in the shooting operation. An assist light control circuit 123 controls lighting of the AF assist light output unit 116 in the focus detection operation. An image sensor driving circuit 124 controls the operation of the image sensor 107, and also A/D-converts an image signal read from the image sensor 107 and outputs it to the CPU 121. An image processing circuit 125 applies image processing such as γ conversion, color interpolation, and JPEG coding to an image signal.

The focus driving circuit 126 drives the focus actuator 114 based on a focus detection result to move the third lens group 105 in the optical axis direction, thereby adjusting focus. The shutter driving circuit 128 drives the shutter actuator 112 to control the opening diameter and open/close timing of the shutter 102. The zoom driving circuit 129 drives the zoom actuator 111 in accordance with a zoom operation that is input when, for example, the user presses a zoom operation switch included in an operation switch group 132.

A display device 131 is, for example, an LCD and displays information about the shooting mode of the digital camera, a preview image before shooting and a verification image after shooting, information about the in-focus state upon focus detection, and the like. The operation switch group 132 includes a power switch, release (shooting trigger) switch, zoom operation switch, and shooting mode selector switch. A recording medium 133 is, for example, a detachable semiconductor memory card and records captured images.

Figure 2:
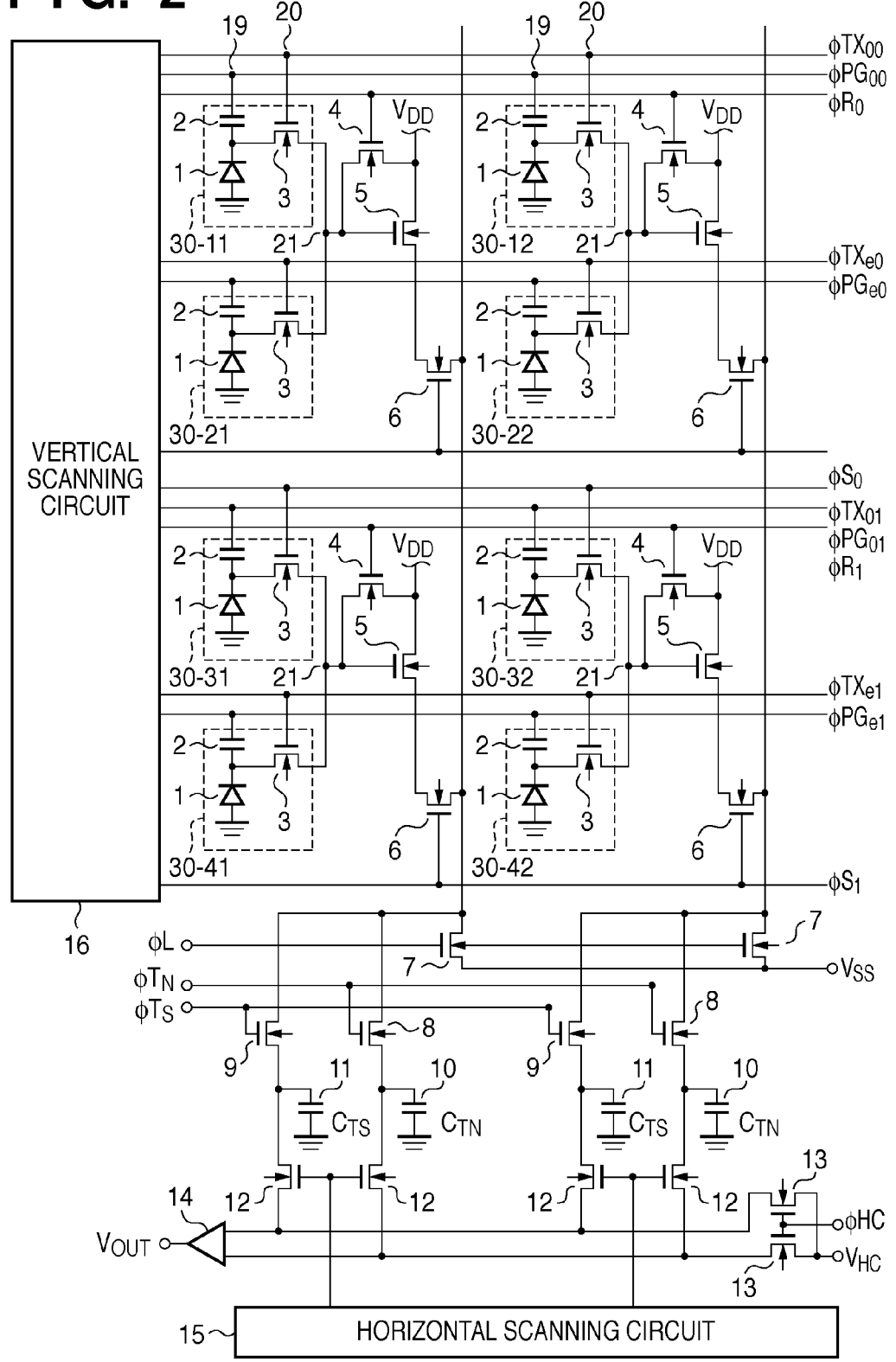
FIG. 2 is a view schematically showing an example of the circuit arrangement of an image sensor according to the first embodiment of the present invention.

FIG. 2 is a view schematically showing an example of the circuit arrangement of the image sensor 107 according to this embodiment.

FIG. 2 illustrates pixels 30-11 to 30-42 on two columns× four rows of a number of pixels included in the image sensor 107. In this embodiment, the image sensor 107 has 3,000 horizontal pixels×2,000 vertical pixels (a total of 6,000,000 pixels) as effective pixels. The pixel pitch is 2 μm. The image-capturing screen size 6 mm×4 mm.

Referring to FIG. 2, each pixel includes a photoelectric conversion unit 1 formed from a MOS transistor gate and a depletion layer under it, a photogate 2, and a transfer switch MOS transistor 3. A reset MOS transistor 4, source follower MOS transistor 5, and horizontal selector switch MOS transistor 6 are provided in correspondence with each pair of pixels in the vertical direction. A source follower load CMOS transistor 7 resets a vertical output line in accordance with a control pulse φL. A dark output transfer MOS transistor 8, bright output transfer MOS transistor 9, dark output integration capacitor $C_{TN}$ 10, and bright output integration capacitor $C_{TS}$ 11 accumulate dark and bright voltages in accordance with control pulses φ$T_N$ and φ$T_S$.

The image sensor 107 also includes horizontal transfer MOS transistors 12, horizontal output line reset MOS transistors 13, differential amplifier 14, horizontal scanning circuit 15, and vertical scanning circuit 16.

Figure 3:
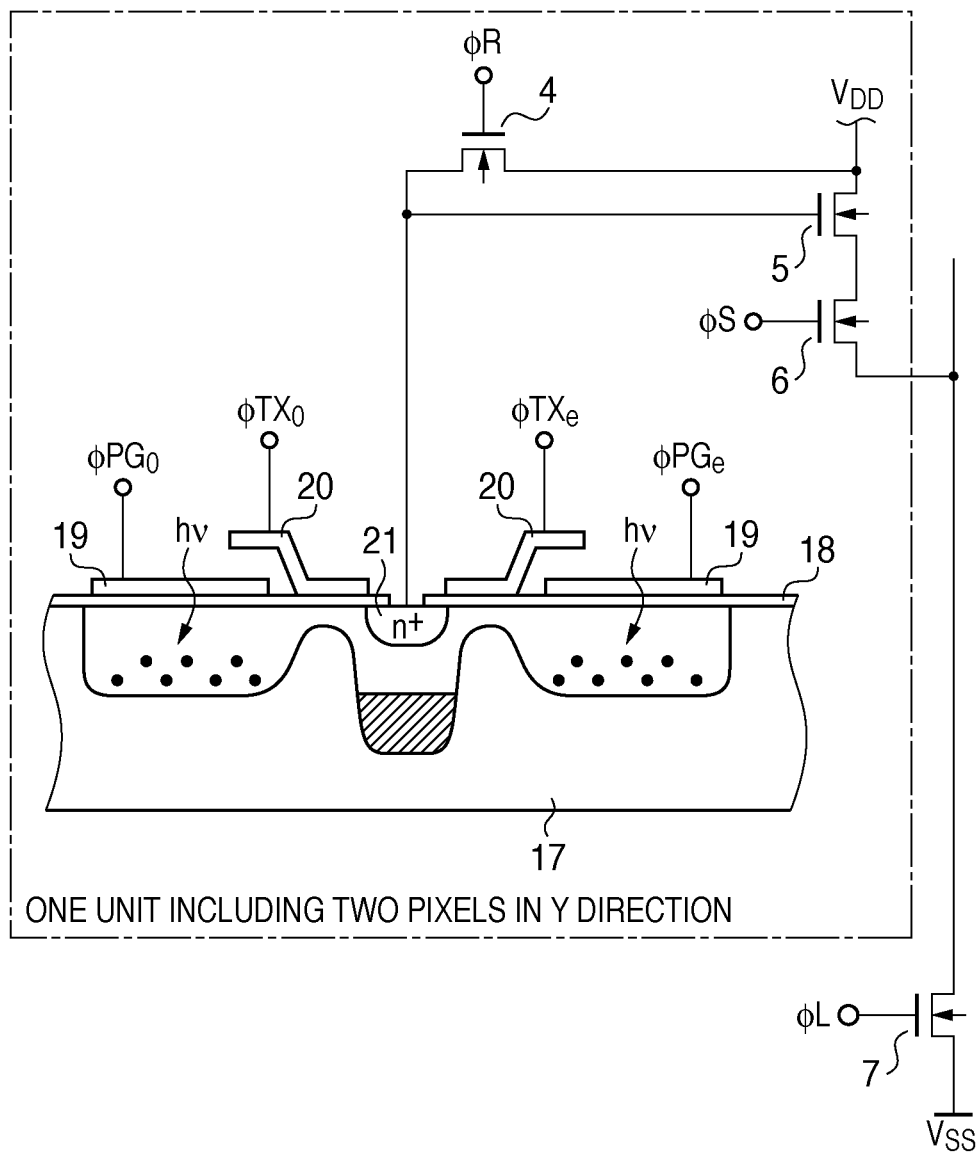
FIG. 3 is a view showing a section of two vertical pixels of the image sensor and their peripheral circuits according to the first embodiment of the present invention.

FIG. 3 is a view showing a section of two vertical pixels (e.g., pixels 30-11 and 30-21) and their peripheral circuits.

Referring to FIG. 3, reference numeral 17 denotes a p-well; 18, a gate oxide film; 19, a first poly-Si layer of the photogate 2; 20, a second poly-Si layer of the photogate 2; and 21, an $n^+$-floating diffusion portion (FD). The FD 21 is connected to another photoelectric conversion unit via another transfer MOS transistor. The structure in FIG. 3 realizes size reduction by using the FD 21 as the drains of the two transfer switch MOS transistors 3 in FIG. 2, and improves the sensitivity by decreasing the capacity of the FD 21. The FD 21 may be connected by an Al interconnection.

Figure 4:
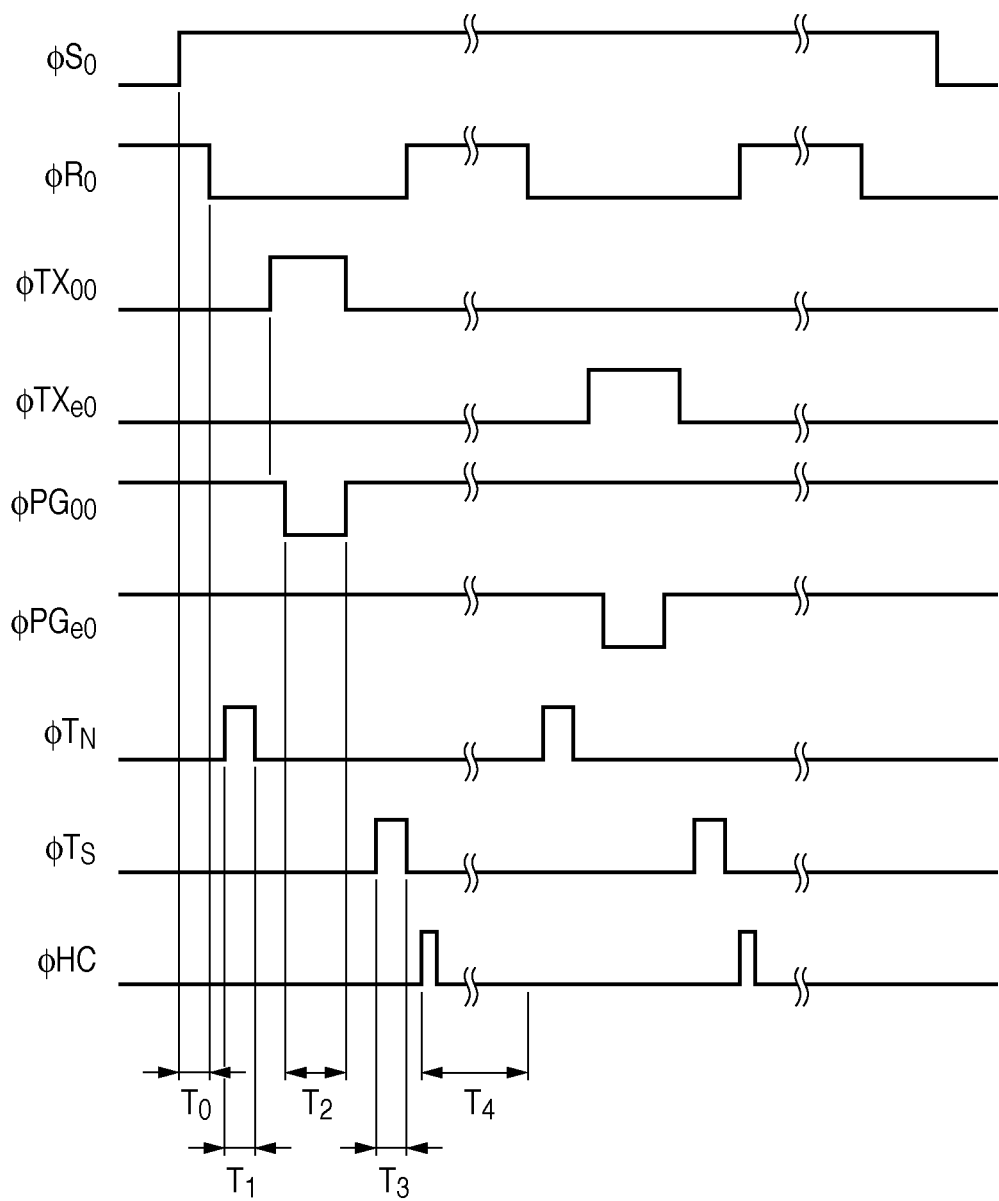
FIG. 4 is a driving timing chart of the image sensor according to the first embodiment of the present invention.

The operation of the image sensor 107 will be described next with reference to the timing chart in FIG. 4. FIG. 4 is a timing chart in a full pixel independent output mode.

First, the control pulse φL goes high in accordance with the timing output from the vertical scanning circuit 16 to turn on the load CMOS transistors 7 and reset the vertical output lines. Additionally, control pulses φ$R_0$, φ$G_{00}$, and φ$PG_{e0}$ go high to turn on the reset MOS transistors 4 and set the first poly-Si layers 19 of the photogates 2 at high level.

At time $t_0$, a control pulse φ$S_0$ goes high to turn on the horizontal selector switch MOS transistors 6 and select the pixel units of the first and second lines. At time ($t_0+T_0$), the control pulse φ$R_0$ goes low so that each FD 21 stops reset and is set in a floating state while making the gate-to-source path of each source follower MOS transistor 5 through. During a period T1 from the time $t_1$, the control pulse φ$T_N$ goes high to perform a source follower operation so that the FDs 21 output a dark voltage to the dark output integration capacitors $C_{TN}$ 10.

To make the pixels of the first line perform photoelectric conversion output, a control pulse φ$TX_{00}$ of the first line goes high to turn on the transfer switch MOS transistors 3. After that, during a period $T_2$ from time $t_2$, the control pulse φ$PG_{00}$ goes low. The voltage relationship at this time raises a potential well that has spread under each photogate 2, and completely transfers the light generation carrier to the FDs 21. If complete transfer is possible, a control pulse φTX need not always be a pulse and may be a fixed potential.

From the time $t_2$ to ($t_2+T_2$), charges from the photoelectric conversion units 1 are transferred to the FDs 21. The potential of each FD 21 changes in accordance with the light amount. At this time, the source follower MOS transistors 5 are in the floating state. Hence, during a period $T_3$ from time $t_3$, the control pulse φ$T_S$ goes high to output the potential of the FDs 21 to the bright output integration capacitors $C_{TS}$ 11. At this point of time, the dark output integration capacitors $C_{TN}$ 10 and the bright output integration capacitors $C_{TS}$ 11 store the dark outputs and bright outputs of the pixels of the first line.

At time $t_4$, a control pulse φHC temporarily goes high to turn on the horizontal output line reset MOS transistors 13 and reset the horizontal output lines. During the horizontal transfer period, the dark output integration capacitor $C_{TN}$ 10 and the bright output integration capacitor $C_{TS}$ 11 output the dark output and bright output of the pixels to the horizontal output lines in accordance with a scan timing signal from the horizontal scanning circuit 15. At this time, the differential amplifier 14 calculates a differential output $V_{OUT}$ between the dark output and the bright output. This enables to obtain a signal having a high S/N ratio by removing the random noise and fixed pattern noise of the pixels.

Photocharges of the pixels 30-12 and 30-22 are stored in the corresponding dark output integration capacitor $C_{TN}$ 10 and bright output integration capacitor $C_{TS}$ 11 simultaneously with the photocharges of the pixels 30-11 and 30-21. The dark output and bright output of the pixels 30-12 and 30-22 are read out to the horizontal output lines by delaying the timing pulse from the horizontal scanning circuit 15 by one pixel and then output from the differential amplifier 14.

In this embodiment, an arrangement for calculating the differential output $V_{OUT}$ in the image sensor 107 has been described. The same effect can be obtained even using a conventional CDS (Correlated Double Sampling) circuit outside the image sensor.

After the bright output is output to the bright output integration capacitor $C_{TS}$ 11, the control pulse φ$R_0$ goes high to turn on the reset MOS transistor 4 and reset the FD 21 to a power supply $V_{DD}$. After horizontal transfer of the first line has ended, the second line is read-accessed.

To read-access the second line, a control pulse φ$TX_{e0}$ and the control pulse φ$PG_{e0}$ are driven in the same way. High pulses are supplied as the control pulses φ$T_N$ and φ$T_S$ to store photocharges in the dark output integration capacitor $C_{TN}$ 10 and the bright output integration capacitor $C_{TS}$ 11, thereby extracting the dark output and bright output. The above-described driving allows to independently read-access the first and second lines.

After that, the vertical scanning circuit performs scanning to read-access the (2n+1)th and (2n+2)th lines in the same way, thereby executing full pixel independent output. More specifically, when n=1, a control pulse φ$S_1$ goes high first. Next, a control pulse φ$R_1$ goes low, and the control pulses φ$T_N$ and φ$TX_{01}$ then go high. Subsequently, a control pulse φ$PG_{01}$ goes low, the control pulse φ$T_S$ goes high, and the control pulse φHC temporarily goes high to read out the pixel signals of the pixels 30-31 and 30-32. After that, control pulses φ$TX_{e1}$ and θ$PG_{e1}$ and the same control pulses as described above are applied to read out the pixel signals of the pixels 30-41 and 30-42.

FIGS. 5A to 7B are views for explaining the structures of image-capturing pixels and focus detection pixels (AF pixels).

The image sensor 107 of the embodiment adopts a Bayer matrix in which pixels having a G (green) spectral sensitivity are arranged as two diagonal pixels of 2×2=4 pixels, and pixels having R (red) and B (blue) spectral sensitivities are respectively arranged as two remaining pixels. The pixels of the Bayer matrix include focus detection pixels which have a structure to be described later and are distributed in accordance with a predetermined rule.

Figure 5B:
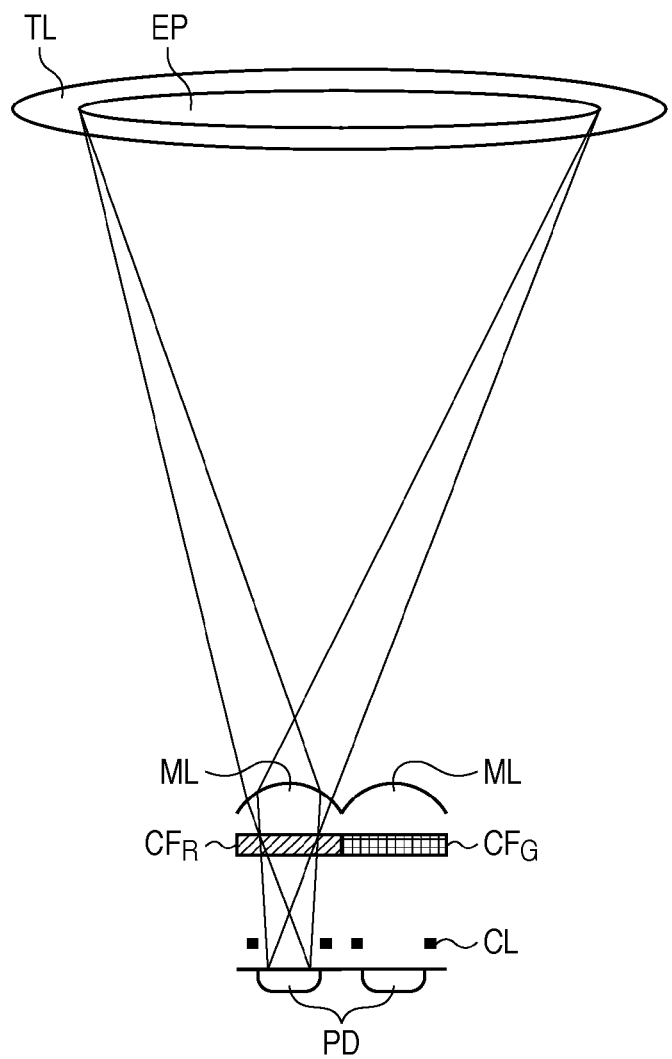
FIGS. 5A and 5B are views showing an example of the layout and structure of image-capturing pixels in the image sensor according to the first embodiment of the present invention.
Figure 5A:
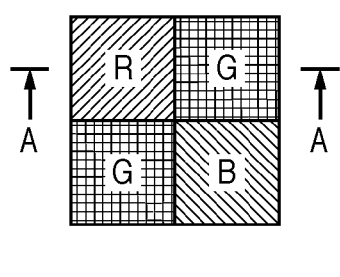

FIGS. 5A and 5B show an example of the layout and structure of image-capturing pixels according to this embodiment.

FIG. 5A is a plan view of 2×2 image-capturing pixels. As described above, in the Bayer matrix, two G pixels are arranged in a diagonal direction, and R and B pixels are arranged as the two remaining pixels. Such a 2×2 array is repeated all over the image sensor 107.

FIG. 5B is a view showing a section taken along a line A-A in FIG. 5A and the optical path from the photographing optical system.

ML indicates an on-chip microlens placed at the forefront of each pixel; $CF_R$, an R (Red) color filter; and $CF_G$, a G (Green) color filter. PD schematically represents the photoelectric conversion unit of each pixel. CL indicates an interconnection layer which forms a signal line to transmit various signals in the CMOS image sensor. TL schematically represents the photographing optical system.

The on-chip microlens ML and the photoelectric conversion unit PD for an image-capturing pixel are configured to receive a light flux that has passed through the photographing optical system TL as effectively as possible. In other words, the on-chip microlens ML makes an exit pupil EP of the photographing optical system TL conjugate with the photoelectric conversion unit PD. The effective area of the photoelectric conversion unit PD is designed to be large. FIG. 5B shows the incident light flux to the R pixel. However, the G and B (Blue) pixels have the same structure. Hence, the exit pupil EP corresponding to each of the R, G, and B image-capturing pixels has a large diameter. This allows effective reception of a light flux from a subject and improves the S/N ratio of an image signal.

FIGS. 6A and 6B show an example of the layout and structure of focus detection pixels (AF pixels) for dividing the pupil in the horizontal direction (lateral direction) of the photographing lens according to the embodiment.

FIG. 6A is a plan view of 2×2 pixels including a pair of focus detection pixels. To obtain an image-capturing signal, G pixels constitute the main component of luminance information. Human's image recognition characteristic is sensitive to luminance information. Hence, if G pixels are lost, image quality degradation is readily noticeable. On the other hand, pixels of colors other than green and, more specifically, R pixels or B pixels acquire color information. Human's image recognition characteristic is insensitive to color information. Hence, even if several pixels to acquire color information are lost, image quality degradation is hard to notice. In this embodiment, of the 2×2 pixels, G pixels are left as image-capturing pixels, and a pair of focus detection pixels $S_{HA}$ and $S_{HB}$ is arranged at the positions of the R and B pixels.

FIG. 6B is a view showing sections (i.e., sections of the pair of focus detection pixels) taken along lines A-A in FIG. 6A and the optical path from the photographing optical system.

The on-chip microlens ML and the photoelectric conversion unit PD have the same structure as in the image-capturing pixel shown in FIG. 5B. In this embodiment, the signal of a focus detection pixel is not used as an image signal. Hence, a colorless, transparent filter $CF_W$ is arranged in place of a color separation filter. Additionally, since a pair of pixels divides the pupil, the position of each opening portion in the interconnection layer CL shifts in one direction with respect to the centerline of the corresponding on-chip microlens ML. That is, the positions of openings of the first AF pixel $S_{HA}$ and second AF pixel $S_{HB}$, which form a pair of focus detection pixels, shift in directions opposite to each other.

More specifically, an opening portion $OP_{HA}$ of the focus detection pixel $S_{HA}$ shifts rightward in the horizontal direction and therefore receives a light flux that has passed through an exit pupil $EP_{HA}$ on the left side of the photographing lens TL. Similarly, an opening portion $OP_{HB}$ of the focus detection pixel $S_{HB}$ shifts leftward in the horizontal direction and therefore receives a light flux that has passed through an exit pupil $EP_{HB}$ on the right side of the photographing lens TL. A luminance waveform acquired by a plurality of focus detection pixels $S_{HA}$ periodically arrayed in the horizontal direction will be defined as an A image waveform (first image waveform). A luminance waveform acquired by a plurality of focus detection pixels $S_{HB}$ periodically arrayed in the horizontal direction will be defined as a B image waveform (second image waveform). Detecting the relative positions of the A and B image waveforms enables to detect the out-of-focus amount (defocus amount) of a subject having a luminance distribution in the horizontal direction.

Note that the pair of focus detection pixels $S_{HA}$ and $S_{HB}$ allows detecting the focus of a subject having a luminance distribution in their array direction, that is, along a vertical line. However, it is impossible to detect the focus of a horizontal line that is a subject having a luminance distribution only in a direction perpendicular to the array direction. In this embodiment, to enable focus detection for the latter subject, focus detection pixels for dividing the pupil in the vertical direction (longitudinal direction) of the photographing lens are also provided.

FIGS. 7A and 7B show an example of the layout and structure of focus detection pixels for dividing the pupil in the vertical direction (longitudinal direction) of the photographing lens according to the embodiment.

FIG. 7A is a plan view of 2×2 pixels including focus detection pixels. As in FIG. 6A, G pixels are left as image-capturing pixels, and a pair of focus detection pixels $S_{VC}$ and $S_{VD}$ is arranged at the positions of the R and B pixels.

FIG. 7B is a view showing sections (i.e., sections of the pair of focus detection pixels) taken along lines A-A in FIG. 7A and the optical path from the photographing optical system.

As is apparent from comparison with FIG. 6B, the structure of the focus detection pixels is the same except that the pixels in FIG. 7B separate the pupil in the vertical direction. More specifically, an opening portion $OP_{VC}$ of the focus detection pixel $S_{VC}$ shifts downward in the vertical direction and therefore receives a light flux that has passed through an exit pupil $EP_{VC}$ on the upper side of the photographing lens TL. Similarly, an opening portion $OP_{VD}$ of the focus detection pixel $S_{VD}$ shifts upward in the vertical direction and therefore receives a light flux that has passed through an exit pupil $EP_{VD}$ on the lower side of the photographing lens TL.

A subject image acquired by a plurality of focus detection pixels $S_{VC}$ periodically arrayed in the vertical direction will be defined as a C image waveform. A subject image acquired by a plurality of focus detection pixels $S_{VD}$ periodically arrayed in the vertical direction will be defined as a D image waveform. Detecting the relative positions of the C and D image waveforms enables to detect the out-of-focus amount (defocus amount) of a subject having a luminance distribution in the vertical direction.

The focus detection pixel $S_{HA}$ or $S_{VC}$ will sometimes be referred to as a first AF pixel, and the focus detection pixel $S_{HB}$ or $S_{VD}$ will sometimes be referred to as a second AF pixel hereinafter.

Figure 8:
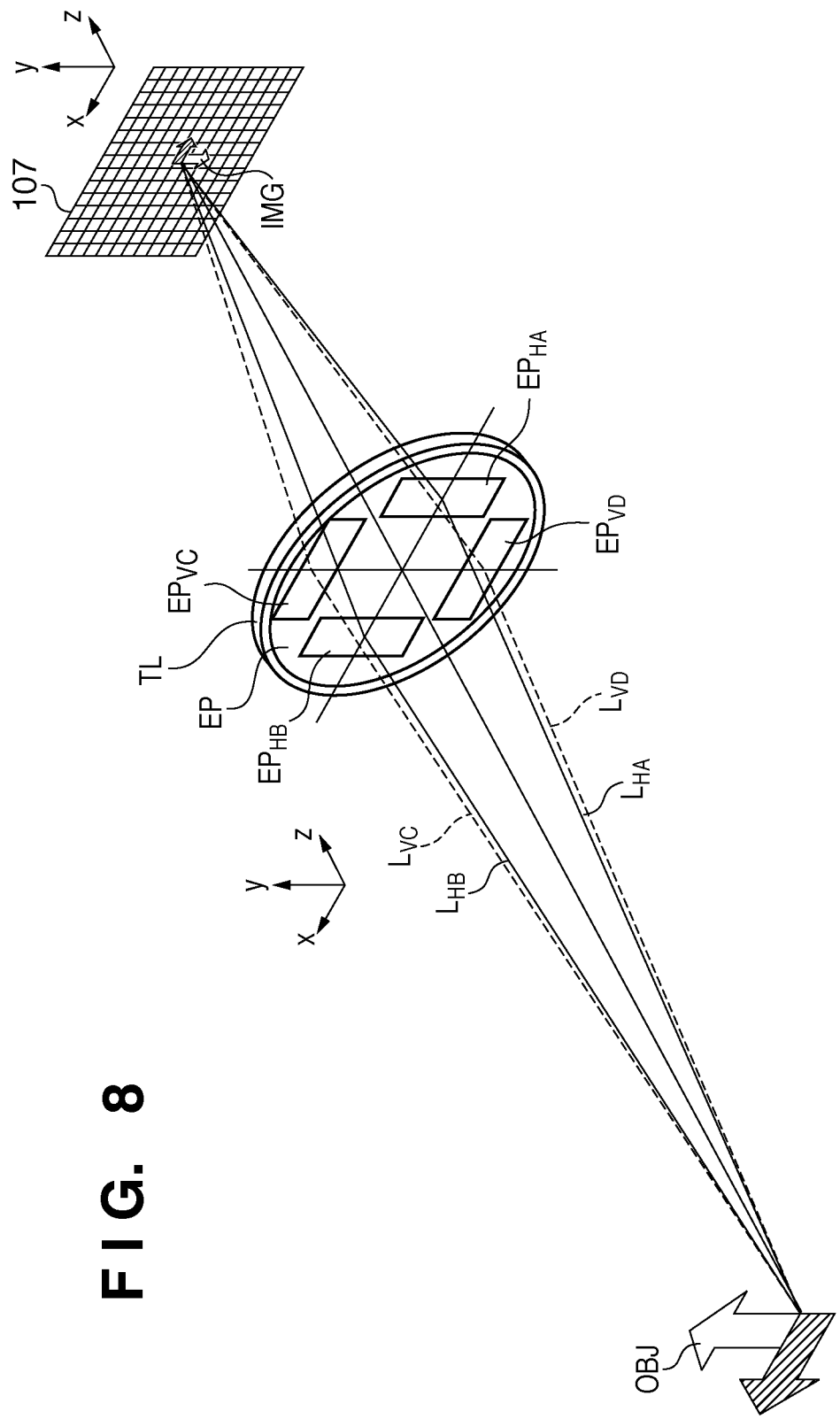
FIG. 8 is a schematic view for explaining pupil division according to the first embodiment of the present invention.

FIG. 8 is a schematic view for explaining pupil division according to the first embodiment.

Referring to FIG. 8, OBJ represents a subject, and IMG, an optical image of the subject OBJ.

As described with reference to FIGS. 5A and 5B, an image-capturing pixel receives a light flux that has passed through the overall exit pupil region EP of the photographing lens. On the other hand, a focus detection pixel has a pupil division function, as described with reference to FIGS. 6A to 7B. More specifically, the focus detection pixel $S_{HA}$ in FIGS. 6A and 6B receives a light flux that has passed through the left pupil when the rear end of the lens is viewed from the imaging plane, that is, the pupil $EP_{HA}$ in FIG. 8. Similarly, the focus detection pixels $S_{HB}$, $S_{VC}$, and $S_{VD}$ receive light fluxes that have passed through the pupils $EP_{HB}$, $EP_{VC}$, and $EP_{VD}$, respectively. The focus detection pixels $S_{HA}$, $S_{HB}$, $S_{VC}$, and $S_{VD}$ are arranged to be periodically distributed on the entire image sensor 107. This enables to detect focus in the overall imaging region.

Figure 9:
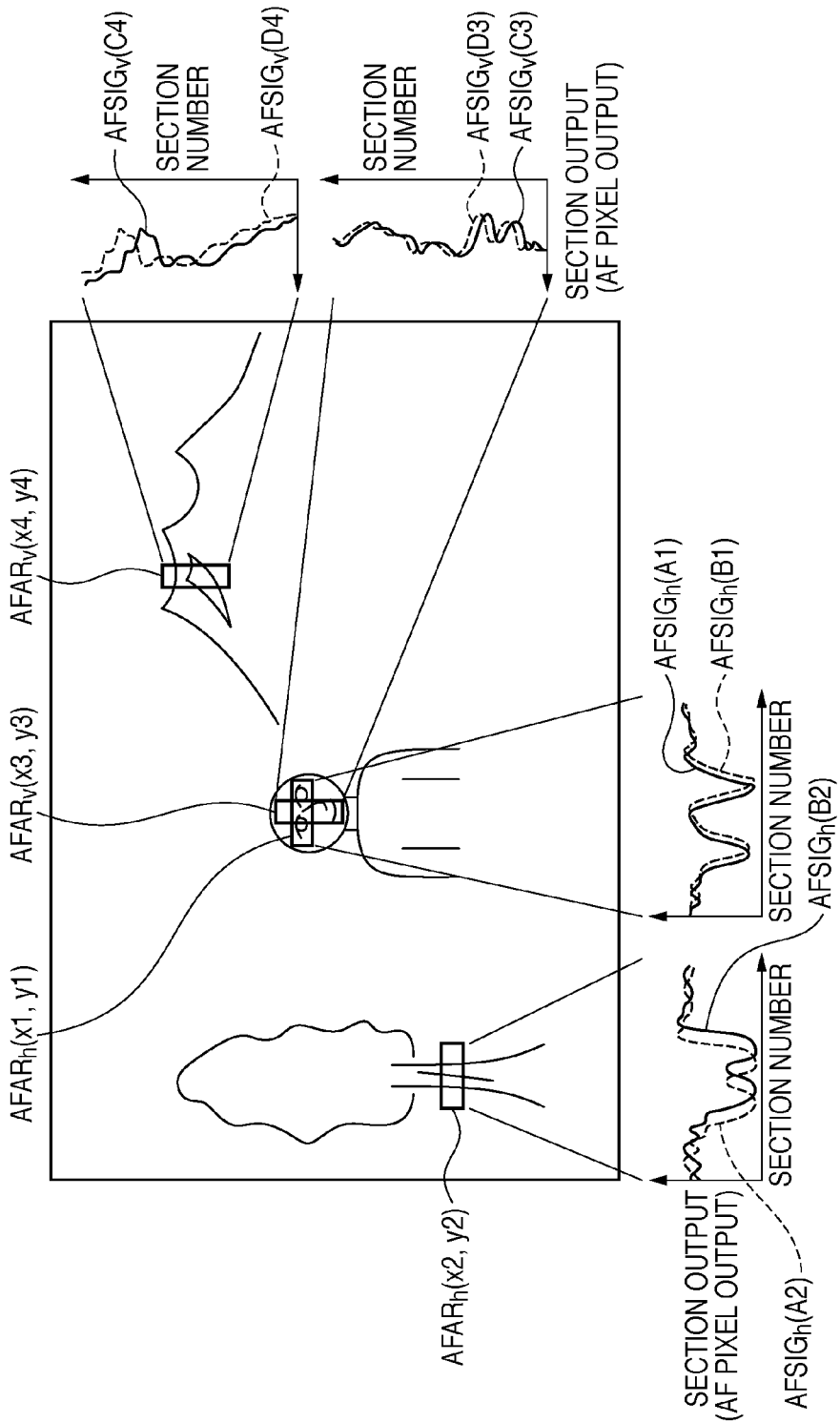
FIG. 9 is a schematic view for explaining an example of a focus detection region and an image acquired upon focus detection in the digital camera according to the first embodiment of the present invention.

FIG. 9 is a schematic view for explaining an example of a focus detection region and an image acquired upon focus detection in the digital camera according to this embodiment.

Referring to FIG. 9, a subject image formed on the imaging plane of the image sensor 107 includes a person at the center, a tree in a close range on the left side, and distant mountains on the right side.

The image sensor of this embodiment includes the first pair of focus detection pixels $S_{HA}$ and $S_{HB}$ to detect focus of a subject having a luminance distribution in the horizontal direction and the second pair of focus detection pixels $S_{VC}$ and $S_{VD}$ to detect focus of a subject having a luminance distribution in the vertical direction. First pairs of focus detection pixels and second pairs of focus detection pixels are arranged to be distributed on the entire image sensor 107 at a uniform density.

A method of arranging the first pairs of focus detection pixels $S_{HA}$ and $S_{HB}$ and the second pairs of focus detection pixels $S_{VC}$ and $S_{VD}$ will be described later in detail. To detect the phase difference in the horizontal direction, a pair of image signals obtained from the first pair of focus detection pixels $S_{HA}$ and $S_{HB}$ is used. To detect the phase difference in the vertical direction, a pair of image signals obtained from the second pair of focus detection pixels $S_{VC}$ and $S_{VD}$ is used. Hence, in this specification, the first pair of focus detection pixels will also be referred to a pair of phase difference detection pixels in the horizontal direction, and the second pair of focus detection pixels will also be referred to a pair of phase difference detection pixels in the vertical direction. It is possible to set a focus detection region for phase difference detection in the horizontal and vertical directions at an arbitrary position of the imaging region by setting a region including pairs of first and second focus detection pixels.

In the example shown in FIG. 9, a human face exists at the center of the screen. For example, when the image processing circuit 125 applies a known face recognition technique to the captured image and detects the existence of the face, a focus detection region can be set around the face region.

More specifically, a focus detection region $AFAR_h(x1,y1)$ for phase difference detection in the horizontal direction and a focus detection region $AFAR_v(x3,y3)$ for phase difference detection in the vertical direction can be set around the face region, as shown in FIG. 9. Note that the subscript h represents the horizontal direction, and $(x1,y1)$ and $(x3,y3)$ represent the pixel coordinate values of the upper left corners of the focus detection regions. The focus detection region $AFAR_h(x1,y1)$ includes 30 first pairs of focus detection pixels $S_{HA}$ and $S_{HB}$. The focus detection region $AFAR_v(x3,y3)$ includes 30 second pairs of focus detection pixels $S_{VC}$ and $S_{VD}$.

Let $AFSIG_h(A1)$ be the A image waveform for phase difference detection which is generated by horizontally joining image signals obtained by the 30 first AF pixels $S_{HA}$ included in the focus detection region $AFAR_h(x1,y1)$. Similarly, let $AFSIG_h(B1)$ be the B image waveform for phase difference detection which is generated by horizontally joining image signals obtained by the 30 second AF pixels $S_{HB}$.

The horizontal phase difference between the A image waveform $AFSIG_h(A1)$ and the B image waveform $AFSIG_h(B1)$ is calculated by known correlation calculation, thereby obtaining the out-of-focus amount (defocus amount) in the horizontal direction.

In the focus detection region $AFAR_v(x3,y3)$ as well, a C image waveform $AFSIG_v(C3)$ and a D image waveform $AFSIG_v(D3)$ are obtained from the 30 focus detection pixels $S_{VC}$ and the 30 focus detection pixels $S_{VD}$, respectively, and the out-of-focus amount in the vertical direction is calculated.

The two out-of-focus amounts detected in the two focus detection regions $AFAR_h(x1,y1)$ and $AFAR_v(x3,y3)$ are compared, and a more reliable value is employed.

On the other hand, the trunk portion of the tree on the left side of the screen mainly contains vertical line components, that is, a luminance distribution in the horizontal direction. Hence, the trunk portion is determined to be a subject suitable for phase difference detection in the horizontal direction. A focus detection region $AFAR_h(x2,y2)$ for phase difference detection in the horizontal direction is set. The ridgeline portion of the mountains on the right side of the screen mainly contains horizontal line components, that is, a luminance distribution in the vertical direction. Hence, a focus detection region $AFAR_v(x4,y4)$ for phase difference detection in the vertical direction is set.

As described above, in this embodiment, the focus detection regions for phase difference detection in the horizontal and vertical directions can be set in arbitrary regions of the screen (image sensor). It is therefore possible to appropriately perform focus detection independently of the position of a subject in the screen and the direction of luminance distribution.

Figure 10:
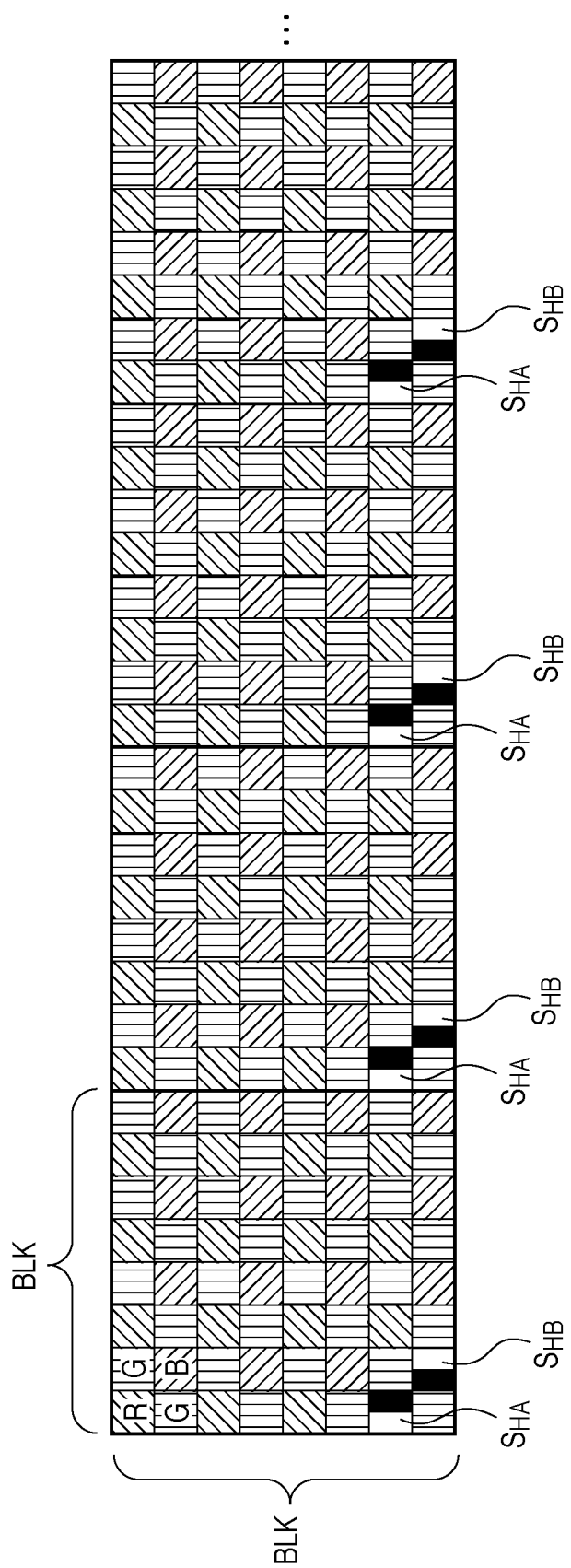
FIG. 10 is a view for explaining the layout rule of pairs of focus detection pixels according to the first embodiment of the present invention.

FIG. 10 is a view for explaining the layout rule of pairs of focus detection pixels according to this embodiment. FIG. 10 illustrates only the layout of the first pairs of focus detection pixels $S_{HA}$ and $S_{HB}$ to help the explanation and understanding.

The image-capturing pixels are divided into blocks each formed from a square region having a predetermined size. A first pair of focus detection pixels $S_{HA}$ and $S_{HB}$ is arranged in each square region. Let BLK (unit: pixel) be the length of one side of the square region. One block is a square region including BLK [pixel]×BLK [pixel]. In the first embodiment, BLK=8 [pixel]. A square region whose each side has a length corresponding to 8 [pixel] is defined as a block.

Referring to FIG. 10, the address of the pixel at the lower left corner of each block is defined as (0,0). The address is defined such that as the pixel position moves by one pixel rightward in the horizontal direction, the second term of the address is incremented by one, and as the pixel position moves by one pixel upward in the vertical direction, the first term of the address is incremented by one. In this embodiment, according to this definition, the first AF pixel $S_{HA}$ is arranged at the pixel (1,0) of each block, and the second AF pixel $S_{HB}$ is arranged at the pixel (0,1).

As described as a problem of the prior arts, since the first AF pixel $S_{HA}$ and the second AF pixel $S_{HB}$ are arranged at different positions, received image waveforms have a shift. The shift amount is proportional to the distance between the first AF pixel $S_{HA}$ and the second AF pixel $S_{HB}$ included in one pair of focus detection pixels. It can arrange them close to each other at a distance shorter than the pitch of the pair of focus detection pixels. In the first embodiment, the first AF pixel $S_{HA}$ and the second AF pixel $S_{HB}$ are arranged adjacent to each other at a minimum distance. Note that for the same reason, the first AF pixel $S_{VC}$ and the second AF pixel $S_{VD}$ included in the second pair of focus detection pixels are also arranged adjacent to each other, as will be described later.

The first pair of focus detection pixels $S_{HA}$ and $S_{HB}$ for phase difference detection in the horizontal direction receives only light fluxes that have passed through the regional pupils $EP_{HA}$ and $EP_{HB}$ obtained by dividing the exit pupil EP of the photographing lens TL in the horizontal direction, as described with reference to FIGS. 6A and 6B.

Hence, directly using the first pair of focus detection pixels $S_{HA}$ and $S_{HB}$ as image-capturing pixels may adversely affect the image quality. To generate the image information of the focus detection pixels, a measure such as interpolation based on image signals obtained from neighboring image-capturing pixels is necessary.

As described above, the output of the G pixel relatively largely contributes to luminance information and therefore largely affects the image quality as compared to the outputs of the B and R pixels.

For this reason, in this embodiment, to suppress the influence on the image quality while arranging the first AF pixel $S_{HA}$ and the second AF pixel $S_{HB}$ adjacent to each other, the first AF pixel $S_{HA}$ and the second AF pixel $S_{HB}$ are arranged at the positions of the R and B pixels which are adjacent in the diagonal direction. Note that for the same reason, the first AF pixel $S_{VC}$ and the second AF pixel $S_{VD}$ included in the second pair of focus detection pixels are also arranged at the positions of the R and B pixels which are adjacent in the diagonal direction, as will be described later.

In a block adjacent in the horizontal direction, the first AF pixel $S_{HA}$ and the second AF pixel $S_{HB}$ are arranged at the same addresses. As a result, the first AF pixels $S_{HA}$ and the second AF pixels $S_{HB}$ are distributed at the pitch BLK [pixel] in the horizontal direction. Image signals obtained from the plurality of focus detection pixels $S_{HA}$ are horizontally joined to generate one image signal (A image waveform) to calculate the phase difference in the horizontal direction. Image signals obtained from the plurality of second AF pixels $S_{HB}$, which are included in the pairs of focus detection pixels together with the plurality of first AF pixels $S_{HA}$ used to generate the A image waveform, are horizontally joined to generate the other image signal (B image waveform) to calculate the phase difference in the horizontal direction.

As described with reference to FIG. 8, the A image waveform and the B image waveform are formed by light fluxes that have passed through the different regional pupils $EP_{HA}$ and $EP_{HB}$ of the exit pupil EP of the photographing lens TL. For this reason, the phase difference between the A image waveform and the B image waveform changes depending on the focusing status of the photographing lens. The principle of focus detection of this embodiment is calculating the phase difference and detecting the focusing status of the photographing lens.

The shift between the A image waveform and the B image waveform generated by the first pair of focus detection pixels $S_{HA}$ and $S_{HB}$ formed from different pixels will be explained with reference to FIGS. 11 and 12.

Figure 11:
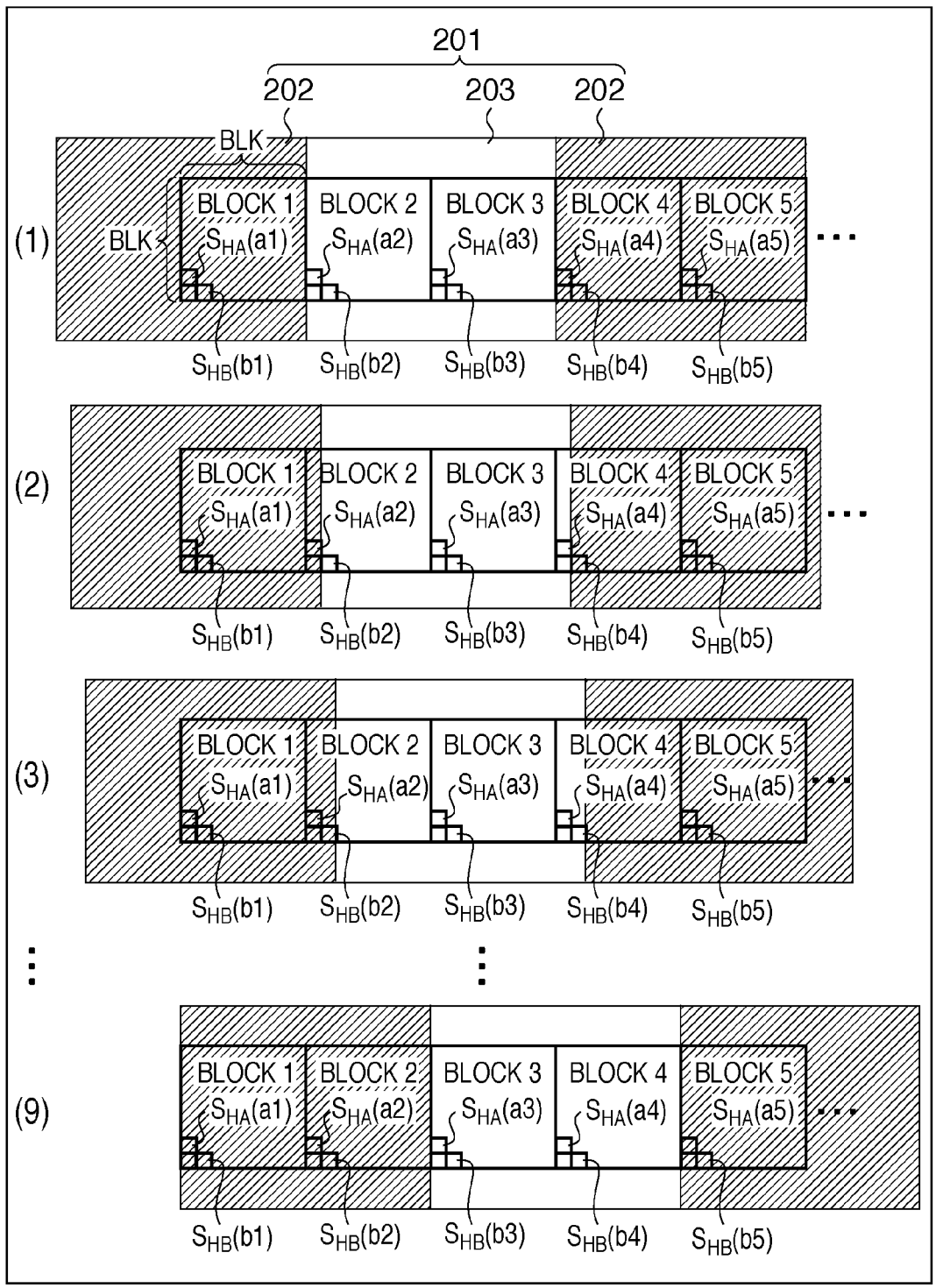
FIG. 11 is a view for explaining a shift between an A image waveform and a B image waveform, which is generated when a first pair of focus detection pixels $S_{HA}$ and $S_{HB}$ includes different pixels.

FIG. 11 illustrates a state in which five blocks 1 to 5 are aligned in the horizontal direction, each of which includes the first AF pixel $S_{HA}$ for focus detection arranged at the address (1,0) and the second AF pixel $S_{HB}$ for focus detection arranged at the address (0,1).

Assume that an image of a subject 201 which includes a white vertical line portion 203 having a width of 2*BLK [pixel] and sandwiched between black portions 202 is formed in an in-focus state on the imaging plane of the image sensor 107. In the in-focus state, the A image waveform and the B image waveform obtained from the first AF pixel $S_{HA}$ and the second AF pixel $S_{HB}$ should be identical without any phase difference.

(1) of FIG. 11 represents a state in which the white vertical line portion 203 is located from the left end of block 2 up to the right end of block 3. Placing focus on first AF pixels $S_{HA}$(a1) to $S_{HA}$(a5) of the respective blocks, the first AF pixel is black in block 1, white in block 2, white in block 3, black in block 4, and black in block 5. Similarly, placing focus on second AF pixels $S_{HB}$(b1) to $S_{HB}$(b5), the second AF pixel is black in block 1, white in block 2, white in block 3, black in block 4, and black in block 5.

Figure 12:
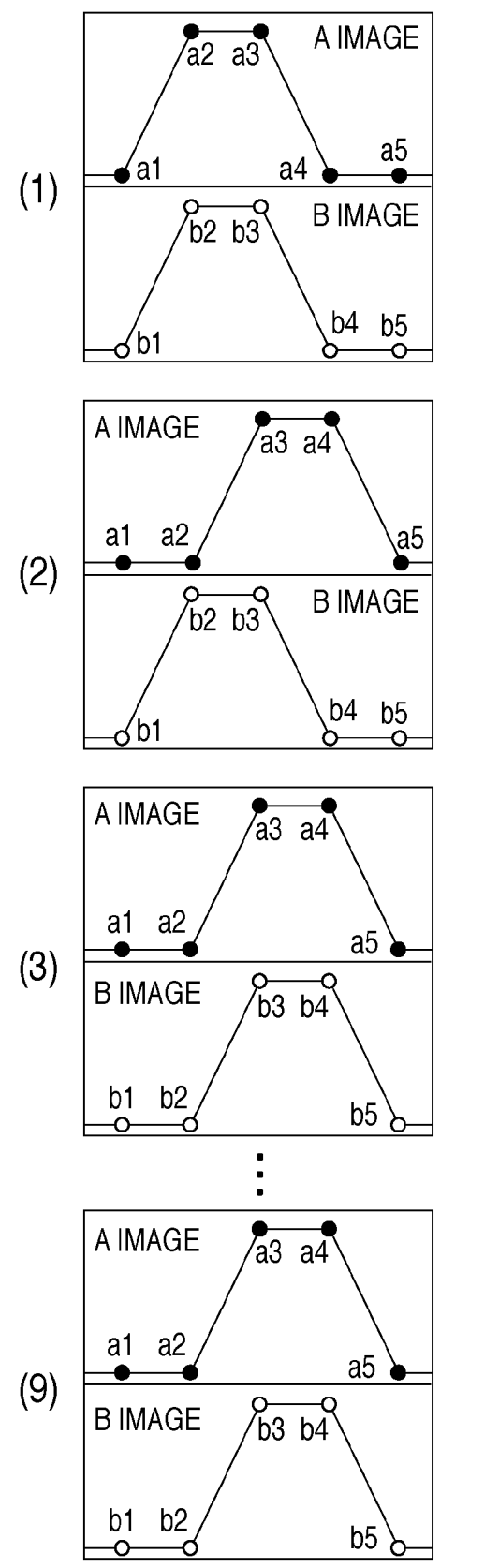
FIG. 12 is a view for explaining a shift between an A image waveform and a B image waveform, which is generated when a first pair of focus detection pixels $S_{HA}$ and $S_{HB}$ includes different pixels.

(1) of FIG. 12 shows an A image waveform and a B image waveform obtained in the state (1) in FIG. 11.

Referring to FIG. 12, signals a1 to a5 are obtained from the first AF pixels $S_{HA}$(a1) to $S_{HA}$(a5) in blocks 1 to 5. Signals b1 to b5 are similarly obtained from the second AF pixels $S_{HB}$(b1) to $S_{HB}$(b5) in blocks 1 to 5. As indicated by (1) of FIG. 12, the A image waveform and the B image waveform obtained in the state (1) in FIG. 11 match each other, and the focusing status is correctly determined as "in-focus".

(2) of FIG. 11 represents a state in which the same pattern as in (1) moves rightward by one pixel. More specifically, the white vertical line portion 203 is located from the boundary between the pair of focus detection pixels $S_{HA}$ and $S_{HB}$ of block 2 up to the boundary between the pair of focus detection pixels $S_{HA}$ and $S_{HB}$ of block 3.

Placing focus on the first AF pixels $S_{HA}$, the first AF pixel is black in block 1, black in block 2, white in block 3, white in block 4, and black in block 5. On the other hand, placing focus on the second AF pixels, the second AF pixel is black in block 1, white in block 2, white in block 3, black in block 4, and black in block 5. That is, the first AF pixel $S_{HA}$ and the second AF pixel $S_{HB}$ see different patterns in blocks 2 and 4.

(2) of FIG. 12 shows an A image waveform and a B image waveform obtained in the state (2) in FIG. 11. In this state, the A image waveform and the B image waveform have a phase difference corresponding to one pitch. Although an in-focus state is obtained actually, the focusing status is determined as "out-of-focus" because the A image waveform and the B image waveform have the phase difference. That is, the focusing status is not correctly determined.

In (3) of FIG. 11 representing a state in which the same pattern as in (1) further moves rightward by one pixel, both the focus detection pixels $S_{HA}$ and $S_{HB}$ in block 2 are black, and both the focus detection pixels $S_{HA}$ and $S_{HB}$ in block 4 are white. Accordingly, an A image waveform and a B image waveform obtained match each other, as indicated by (3) of FIG. 12.

From then on, the first AF pixel $S_{HA}$ and the second AF pixel $S_{HB}$ correspond to the same color of the pattern in all blocks up to (9) of FIG. 11 and (9) of FIG. 12, which represent a state in which the pattern moves rightward by eight pixels. Hence, the A image waveform matches the B image waveform.

In the first embodiment, the focus detection pixels $S_{HA}$ and $S_{HB}$ used in a pair are arranged adjacent to each other to make the distance between them as short as possible. In this layout, only when an edge of the subject image is located at the boundary between the first AF pixel $S_{HA}$ and the second AF pixel $S_{HB}$, as indicated by (2) of FIG. 11, the A image waveform does not match the B image waveform regardless of the in-focus state.

In the example of FIG. 11, the first AF pixel $S_{HA}$ and the second AF pixel $S_{HB}$ included in a first pair of focus detection pixels are arranged adjacent to each other. The horizontal pitch of the first pairs of focus detection pixels is 8 [pixel]. Hence, the probability that the edge of the subject image will be located at the boundary between the first AF pixel $S_{HA}$ and the second AF pixel $S_{HB}$ is supposed to be almost ⅛.

On the other hand, assume that focus detection pixels of different types (corresponding to $S_{HA}$ and $S_{HB}$) are arranged at a pitch ½ that of focus detection pixels of the same type (e.g., $S_{HA}$), as disclosed in patent reference 3 described above. In this case, the probability that the focus detection pixels $S_{HA}$ and $S_{HB}$ in the same block will see different patterns is very high and almost ½.

FIGS. 11 and 12 show an example of a simple subject image to help the explanation and understanding. A general subject image often has a number of edges. For this reason, blocks in which the first AF pixel $S_{HA}$ and the second AF pixel $S_{HB}$ see the same pattern and blocks in which the first AF pixel $S_{HA}$ and the second AF pixel $S_{HB}$ see different patterns are mixed. The ratio of the blocks determines the magnitude of detection errors. In this embodiment, the first AF pixel $S_{HA}$ and the second AF pixel $S_{HB}$ included in a first pair of focus detection pixels are arranged adjacent to each other. This suppresses the probability that the first and second AF pixels will see different patterns, and reduces focus detection errors.

A method of arranging, in the vertical direction, the first pairs of focus detection pixels $S_{HA}$ and $S_{HB}$ for phase difference detection in the horizontal direction according to this embodiment will be described next.

Figure 13:
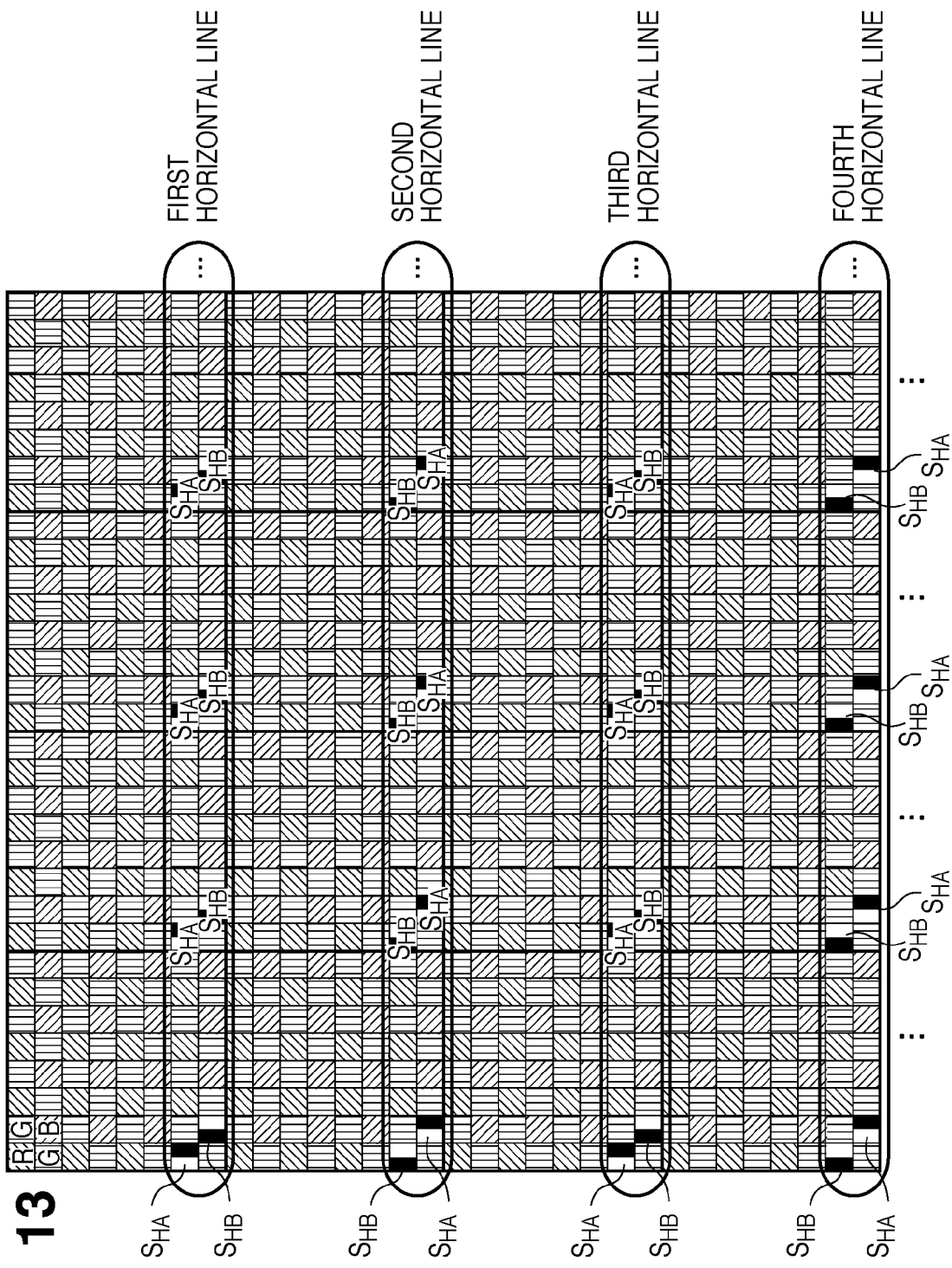
FIG. 13 is a view showing a layout example of first pairs of focus detection pixels $S_{HA}$ and $S_{HB}$ in 4×4=16 blocks according to the first embodiment of the present invention.

FIG. 13 is a view showing a layout example of the first pairs of focus detection pixels $S_{HA}$ and $S_{HB}$ in 4×4=16 blocks according to this embodiment.

Figure 14:
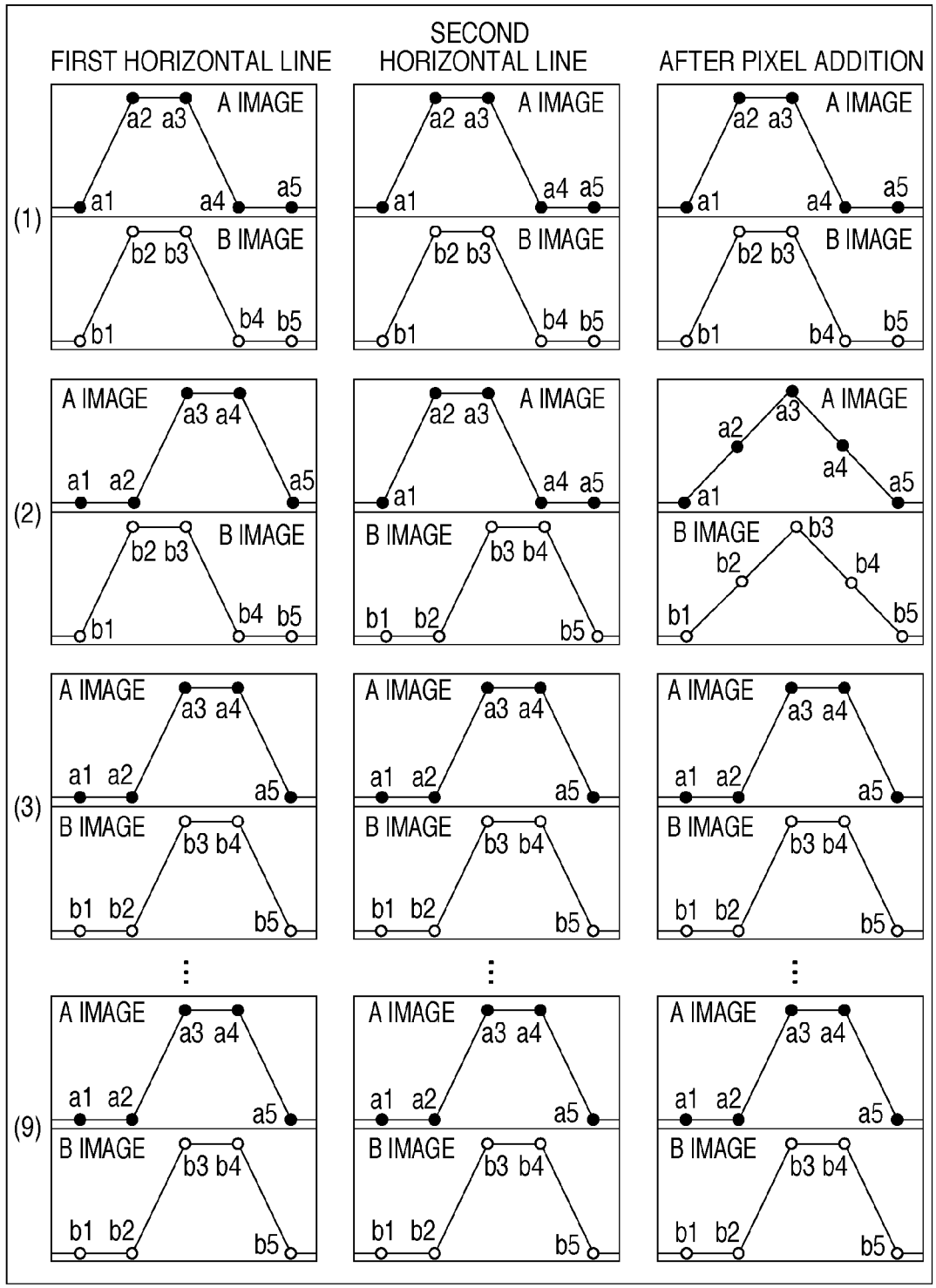
FIG. 14 is a view showing A image waveforms and B image waveforms obtained upon application to the pairs of focus detection pixels arranged as shown in FIG. 13 while shifting the pattern as in FIG. 11.

FIG. 14 shows A image waveforms and B image waveforms obtained upon application to the pairs of focus detection pixels arranged as shown in FIG. 13 while shifting the pattern as in FIG. 11.

In this case, a set of first pairs of focus detection pixels $S_{HA}$ and $S_{HB}$ arranged on the uppermost block line will be referred to as a first horizontal line. A set of first pairs of focus detection pixels $S_{HA}$ and $S_{HB}$ of the second block line will be referred to as a second horizontal line. Similarly, the remaining sets of first pairs of focus detection pixels will subsequently be referred to as a third horizontal line and a fourth horizontal line.

In each block of the first horizontal line, the first AF pixel $S_{HA}$ of the first pair of focus detection pixels is arranged at the address (1,0), and the second AF pixel $S_{HB}$ is arranged at the address (0,1). Hence, as described with reference to (2) of FIG. 11, if an edge of the subject image is located at the boundary between the focus detection pixels $S_{HA}$ and $S_{HB}$, the B image waveform shifts leftward with respect to the A image waveform, as indicated by the first horizontal line (2) in FIG. 14.

On the other hand, in this embodiment, the layout of the first and second AF pixels in the blocks of the second horizontal line is opposite to that in the first and third horizontal lines. That is, the position of the first AF pixel $S_{HA}$ is switched to the address (0,1), and the position of the second AF pixel $S_{HB}$ is switched to the address (1,0).

More generally speaking, the layouts of the first and second AF pixels are switched in two pairs of focus detection pixels, which are adjacent in a direction perpendicular to the pupil division direction and whose first and second AF pixels have boundaries at the same position.

As a result, if the edge of the subject image is located at the boundary between the focus detection pixels $S_{HA}$ and $S_{HB}$, the B image waveform shifts rightward with respect to the A image waveform, as indicated by the second horizontal line (2) in FIG. 14.

The boundary positions between the focus detection pixels $S_{HA}$ and $S_{HB}$ in the first horizontal line are the same as those in the second horizontal line. Hence, if the edge position of the subject is the same between the first and second horizontal lines, the phase shift between the A image waveform and the B image waveform occurs simultaneously in the first and second horizontal lines. The shift amounts are equal, and the shirts occur in opposite directions.

In this embodiment, two sets of image waveforms obtained from the two pairs of focus detection pixels, which are adjacent in the direction perpendicular to the pupil division direction and whose first and second AF pixels have boundaries at the same position, are averaged or added. This makes it possible to cancel out the shift between image waveforms when the edge of the subject image is located at the boundary between the AF pixels and further suppress the focus detection error occurrence probability.

The first and second horizontal lines correspond to subject portions which are different in the vertical direction. For this reason, one of the lines may correspond to a contrast pattern unsuitable for focus detection. The contrast pattern unsuitable for focus detection is, for example, a low-contrast subject or a subject whose sharpness is very poor. If the reliability of the image waveform obtained from the first horizontal line is clearly different from that of the image waveform obtained from the second horizontal line, averaging may be done after assigning a weight to the more reliable image waveform. For example, if the reliability of the image waveform obtained from the first horizontal line is low, the image waveforms can be averaged after weighting the image waveform detected in the second horizontal line twice with respect to the image waveform detected in the first horizontal line.

Alternatively, image signals may be added instead of averaging the image waveforms obtained from the first and second horizontal lines.

As shown in FIG. 14, concerning A image waveforms a1 to a5 and B image waveforms b1 to b5 obtained from the first horizontal line and A image waveforms a1 to a5 and B image waveforms b1 to b5 obtained from the second horizontal line, the outputs of the respective pixels are added. The obtained A image waveforms a1 to a5 and B image waveforms b1 to b5 have no phase shift even when the edge of the subject image is located at the boundary between the focus detection pixels $S_{HA}$ and $S_{HB}$, as indicated by "after pixel addition" (2) in FIG. 14.

In this way, the outputs of focus detection pixels located at the same position in the pupil division direction in two focus detection pixel pair lines which are adjacent in the direction perpendicular to the pupil division direction are added. This also reduces focus detection errors that occur when the pair of focus detection pixels includes different pixels.

In the third horizontal line, fifth horizontal line, . . . , the first AF pixel $S_{HA}$ and the second AF pixel $S_{HB}$ are arranged in the same manner as in the first horizontal line. In the fourth horizontal line, sixth horizontal line, . . . , they are arranged in the same manner as in the second horizontal line.

FIG. 13 extracts only the 4×4 block region for the descriptive convenience. Applying the layout rule shown in FIG. 13 to the entire region of the image sensor 107 makes it possible to reduce, at an arbitrary portion of the imaging region, focus detection errors generated when each pair of focus detection pixels includes different pixels.

The layout of the pair of horizontal phase difference detection pixels (first pair of focus detection pixels) $S_{HA}$ and $S_{HB}$ according to the embodiment has been described above.

A rule applied to arrange the pair of vertical phase difference detection pixels $S_{VC}$ and $S_{VD}$ in addition to the pair of horizontal phase difference detection pixels $S_{HA}$ and $S_{HB}$ will be described next with reference to FIG. 15.

As described above, the focus detection pixels $S_{HA}$, $S_{HB}$, $S_{VC}$, and $S_{VD}$ receive only light fluxes that have passed through the regional pupils $EP_{HA}$, $EP_{HB}$, $EP_{VC}$, and $EP_{VD}$ on the left, right, upper, and lower sides of the exit pupil EP of the photographing lens TL. Hence, directly using the focus detection pixels as image-capturing pixels adversely affects the image quality. To prevent this, the image information of the focus detection pixels needs to be generated by, for example, performing interpolation based on outputs from neighboring image-capturing pixels.

If the focus detection pixels $S_{HA}$, $S_{HB}$, $S_{VC}$, and $S_{VD}$ are distributed nonuniformly, some regions may include many pixels to be generated by interpolation, or the amount of information to be used for interpolation may be insufficient, resulting in an adverse effect on the image quality. To avoid this, the second pair of focus detection pixels $S_{VC}$ and $S_{VD}$ for phase difference detection in the vertical direction is arranged at the intermediate position between two adjacent pairs of horizontal phase difference detection pixels $S_{HA}$ and $S_{HB}$ in both the horizontal and vertical directions.

In this embodiment, the pairs of horizontal phase difference detection pixels $S_{HA}$ and $S_{HB}$ are arranged in a square pattern at an equal pitch (8 [pixel]) in both the horizontal and vertical directions. In this case, the pairs of vertical phase difference detection pixels $S_{VC}$ and $S_{VD}$ are arranged in a square pattern while being shifted by a ½ pitch in both the horizontal and vertical directions. A staggered arrangement is obtained as a whole.

Figure 15:
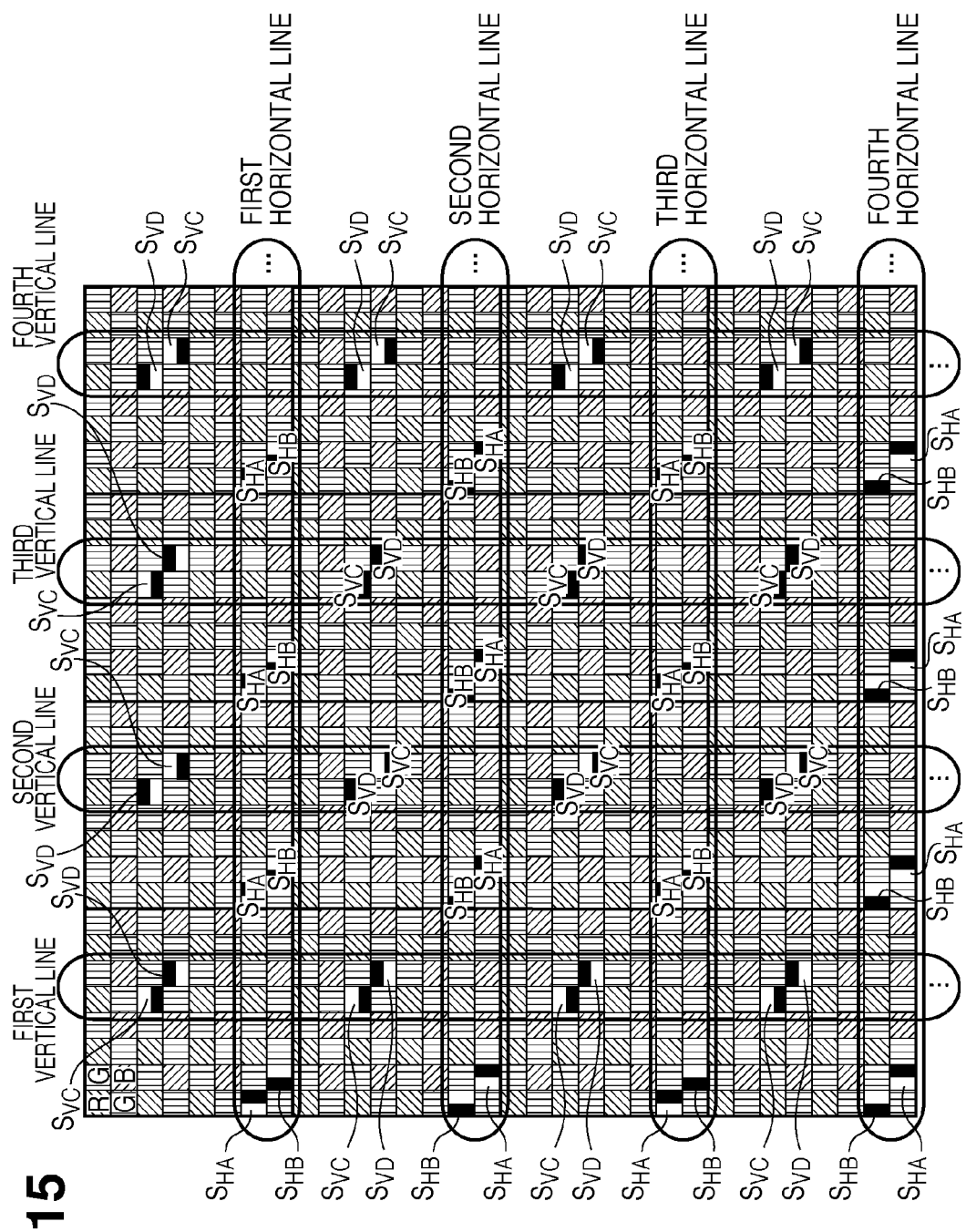
FIG. 15 is a view for explaining the layout rule of focus detection pixels in the image sensor according to the first embodiment of the present invention.

As shown in FIG. 15, assume that the first AF pixel $S_{HA}$ and the second AF pixel $S_{HB}$ included in the first pair of focus detection pixels are arranged at the addresses (1,0) and (0,1) in each block. In this case, the first AF pixel $S_{VC}$ and the second AF pixel $S_{VD}$ included in the second pair of focus detection pixels are arranged at addresses (5,4) and (4,5) in each block. This enables to reduce image quality degradation caused by nonuniformly distributed focus detection pixels.

Note that to cancel out an image signal shift generated when an edge of the subject image is located at the boundary between a pair of pixels, the layouts of the first and second AF pixels in each pair of horizontal phase difference detection pixels $S_{HA}$ and $S_{HB}$ are switched in every other horizontal line. For the same reason, the layouts of the first and second AF pixels in each pair of vertical phase difference detection pixels $S_{VC}$ and $S_{VD}$ are switched in every other vertical line.

More specifically, the layouts of the first and second AF pixels are switched in two pairs of focus detection pixels, which are adjacent in the direction perpendicular to the pupil division direction and whose first and second AF pixels have boundaries at the same position.

Referring to FIG. 15, in each block of the first vertical line, the first AF pixel $S_{VC}$ of the second pair of focus detection pixels is arranged at (5,4), and the second AF pixel $S_{VD}$ is arranged at (4,5). Hence, as described concerning the horizontal phase difference detection pixels $S_{HA}$ and $S_{HB}$ with reference FIGS. 11 and 12, if an edge of the subject image is located at the boundary between the pixels $S_{VC}$ and $S_{VD}$, the D image waveform shifts upward with respect to the C image waveform.

On the other hand, in each block of the second vertical line, the first AF pixel $S_{VC}$ of the second pair of focus detection pixels is arranged at (4,5), and the second AF pixel $S_{VD}$ is arranged at (5,4). The layouts of the first AF pixel $S_{VC}$ and the second AF pixel $S_{VD}$ are switched. Hence, if an edge of the subject image is located at the boundary between the pixels $S_{VC}$ and $S_{VD}$, the D image waveform shifts downward with respect to the C image waveform.

The boundary positions between the focus detection pixels $S_{VC}$ and $S_{VD}$ in the first vertical line are the same as those in the second vertical line. Hence, if the edge position of the subject in the first vertical line is the same as in the second vertical line, the phase shift between the C image waveform and the D image waveform occurs simultaneously in the first and second vertical lines. The shift amounts are equal, and the shirts occur in opposite directions. This is based on the same principle as that described concerning the pairs of horizontal phase difference detection pixels $S_{HA}$ and $S_{HB}$ with reference to FIG. 14.

As described above, in this embodiment, two sets of image waveforms obtained from the two pairs of focus detection pixels, which are adjacent in the direction perpendicular to the pupil division direction and whose first and second AF pixels have boundaries at the same position, are averaged or added. This makes it possible to cancel out the shift between image waveforms when the edge of the subject image is located at the boundary between the AF pixels and further suppress the focus detection error occurrence probability.

In the third vertical line, fifth vertical line, . . . , the first AF pixel $S_{VC}$ and the second AF pixel $S_{VD}$ are arranged in the same manner as in the first vertical line. In the fourth vertical line, sixth vertical line, . . . , they are arranged in the same manner as in the second vertical line.

Even for the C image waveform and the D image waveform, averaging may be done after assigning a weight corresponding to the reliability, or the image waveforms may be added instead of averaging.

The pair of horizontal phase difference detection pixels $S_{HA}$ and $S_{HB}$ and the pair of vertical phase difference detection pixels $S_{VC}$ and $S_{VD}$ are arranged in this way. This allows simultaneous reduction in image quality degradation caused by nonuniformly distributed pairs of focus detection pixels, and deduction in focus detection errors generated when the pair of focus detection pixels are formed from different pixels.

Figure 16:
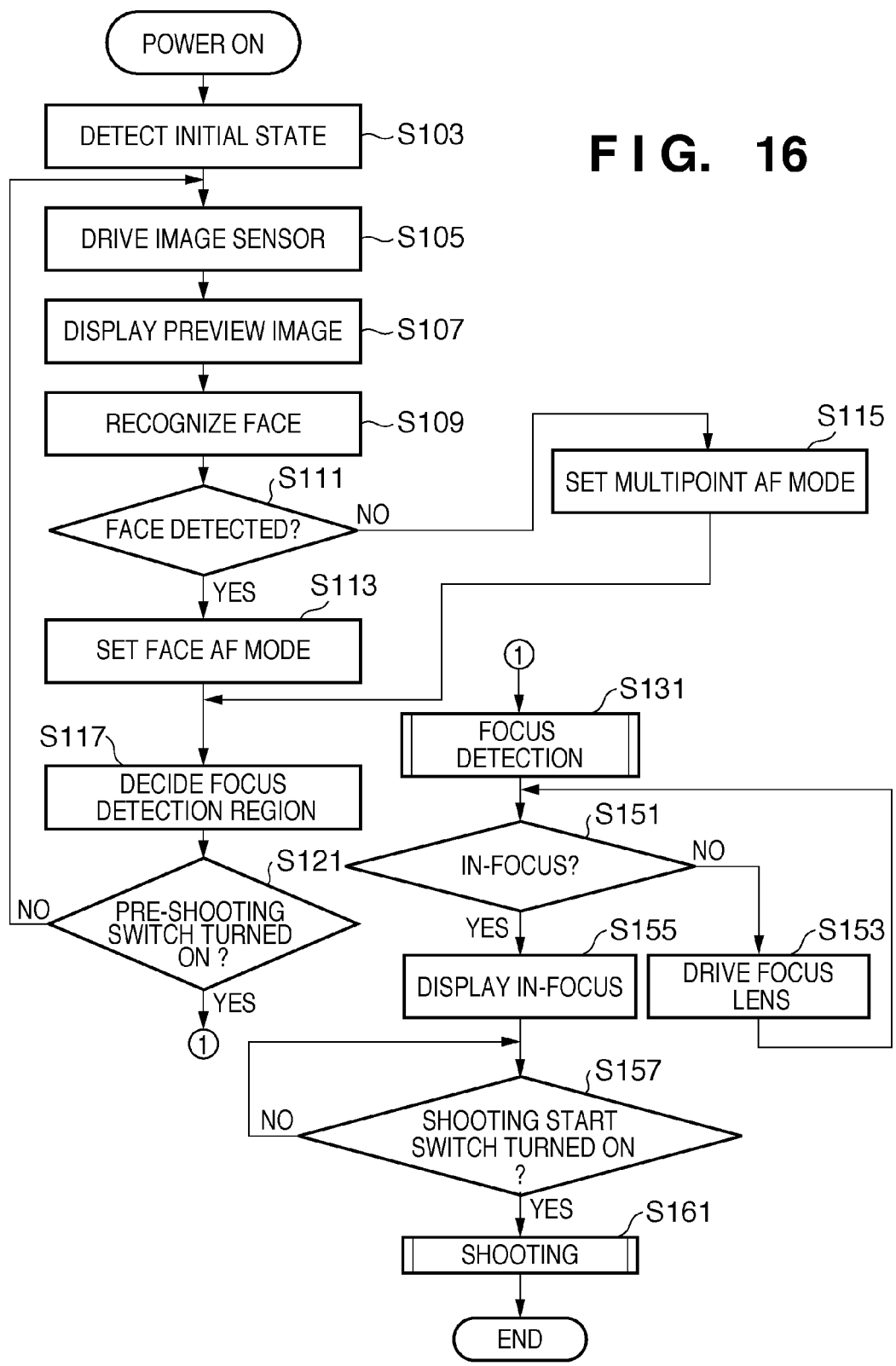
FIG. 16 is a flowchart for explaining the overall operation of the digital camera according to the first embodiment of the present invention.
Figure 17:
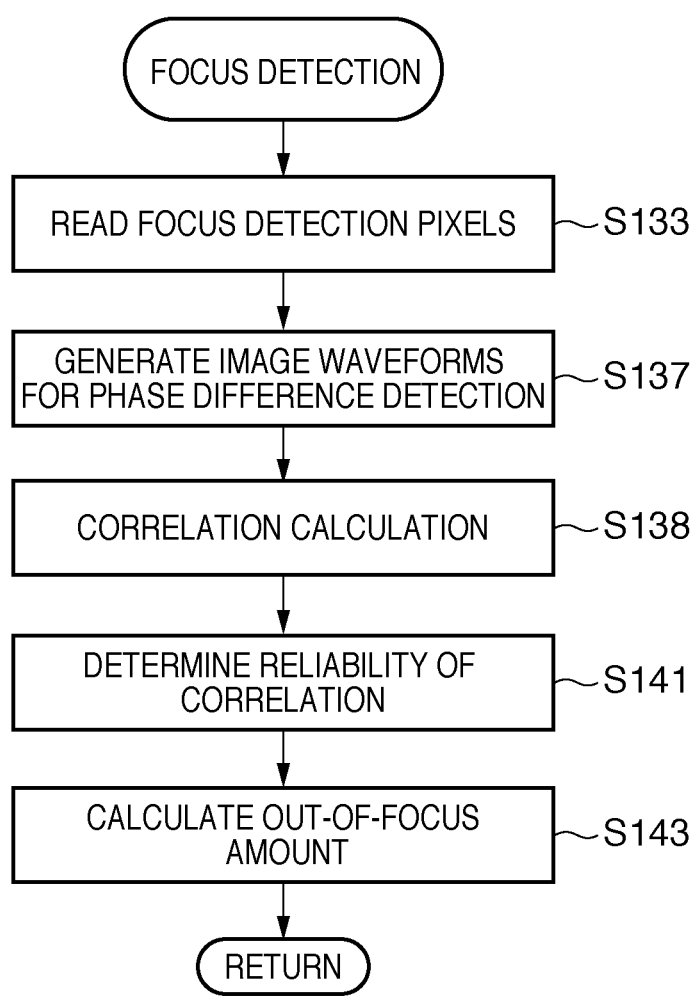
FIG. 17 is a flowchart for explaining details of the focus detection processing of the digital camera according to the first embodiment of the present invention.
Figure 18:
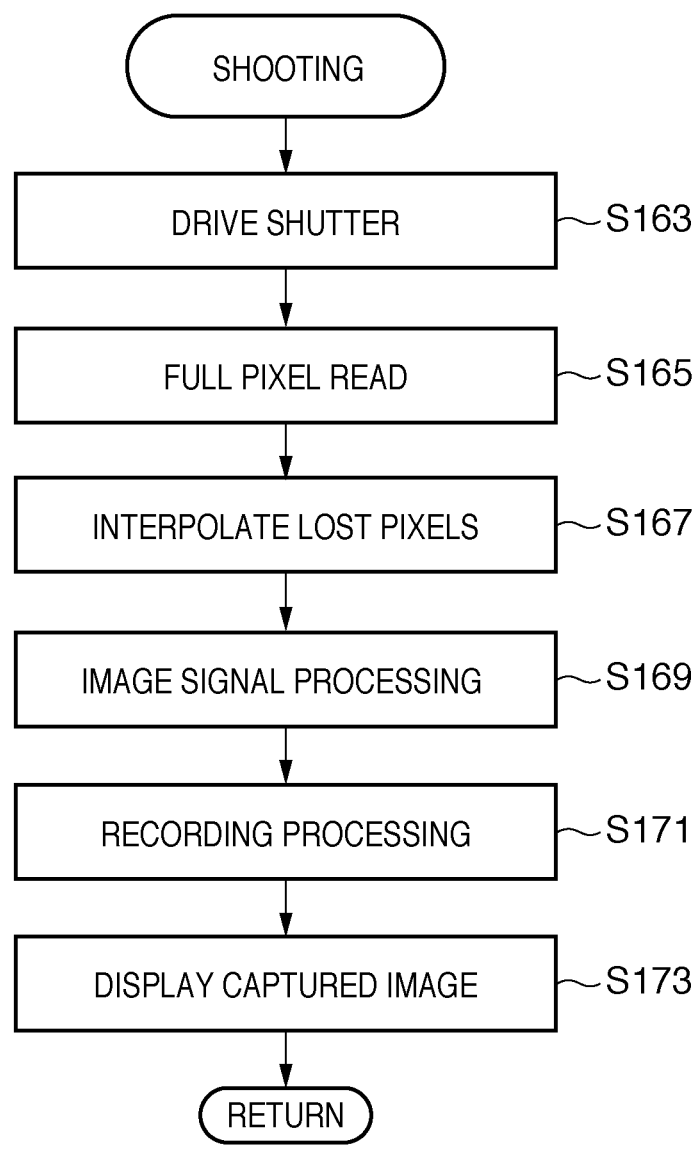
FIG. 18 is a flowchart for explaining details of the shooting processing of the digital camera according to the first embodiment of the present invention.

FIGS. 16 to 18 are flowcharts for explaining the focusing and shooting operations of the digital camera according to this embodiment.

FIG. 16 is a flowchart for explaining the overall operation of the digital camera according to this embodiment.

When the user turns on the power switch in the operation switch group 132, the CPU 121 confirms the operations of the actuators and image sensor in the camera, initializes the memory contents and execution programs, and executes a pre-shooting operation in step S103.

In step S105, the CPU 121 starts the image-capturing operation of the image sensor 107 via the image sensor driving circuit 124. The image processing circuit 125 processes a captured image to generate a display image (having a resolution lower than an image to be recorded). The image processing circuit 125 also detects a human face from the display image.

In step S107, the CPU 121 sequentially outputs, to the display device 131, display images generated by the image processing circuit 125, thereby causing the display device 131 to function as an EVF. The user decides the composition for shooting while viewing the image displayed on the display device 131.

In step S109, the CPU 121 acquires, from the image processing circuit 125, the face detection result and, if a face is detected, information about the face region. When a face has been detected, the process advances from step S111 to step S113, and the CPU 121 sets the focusing mode to a face AF mode. The face AF mode indicates an AF mode for setting a focus detection region in the face region.

If no face has been detected from the display image, the process advances from step S111 to step S115, and the CPU 121 sets the focusing mode to a multipoint AF mode. The multipoint AF mode indicates a mode for dividing the shooting region into a plurality of regions (e.g., 3×5=15 regions), detecting focus in each divided region, and setting, as a final focus detection region, a divided region including a main subject estimated from the focus detection result and subject luminance information.

After the AF mode is decided in step S113 or S115, the CPU 121 decides the focus detection region in step S117. In step S121, the CPU 121 determines whether the pre-shooting switch is turned on. If the switch is not turned on, the process returns to step S105 to repeatedly execute the process from image sensor driving to focus detection region decision in step S117.

In step S121, the CPU 121 detects the state of the pre-shooting switch in the operation switch group 132. If the switch is ON, the process advances to step S131. If the switch is not ON, the process returns to step S105. The pre-shooting switch may be turned on when the user presses, for example, the release button halfway.

FIG. 17 is a flowchart for explaining details of focus detection processing in step S131.

In step S133, the CPU 121 reads, based on layout information stored in advance, focus detection pixels included in the focus detection region decided in step S117 via the image sensor driving circuit 124.

In step S137, the CPU 121 joins signals read from the first AF pixel groups and second AF pixel groups in the first pair of focus detection pixels and the second pair of focus detection pixels, thereby generating pairs of image waveforms for phase difference detection as shown in FIGS. 9, 12, and 14. More specifically, the pair of signals $AFSIG_h(A1)$ and $AFSIG_h(B1)$ or the pair of signals $AFSIG_v(C3)$ and $AFSIG_v(D3)$ shown in FIG. 9 is generated.

In step S139, the CPU 121 performs correlation calculation of the pair of image waveforms, thereby calculating the phase difference between the image waveforms.

In step S141, the CPU 121 determines the reliability of the correlation calculation result. The reliability indicates the degree of coincidence of the pair of image waveforms (waveform similarity). If the degree of coincidence is high, the reliability of the focus detection result is high in general. When a plurality of focus detection regions are selected, a phase difference based on a reliable pair of image waveforms can be used.

In step S143, the CPU 121 calculates the final out-of-focus amount based on the phase difference obtained from the reliable pair of image waveforms, and ends the focus detection processing.

Referring back to FIG. 16, the CPU 121 determines in step S151 whether the out-of-focus amount calculated in the focus detection processing is equal to or smaller than a tolerance (the focusing status can be determined as "in-focus"). If the out-of-focus amount is larger than the tolerance, the CPU 121 determines the focusing status as "out-of-focus", and drives the focus lens (third lens group) 105 by a predetermined amount in a predetermined direction via the focus driving circuit 126 in step S153. The process in steps S131 and S153 is repeatedly executed until the focusing status is determined as "in-focus" in step S151.

Upon determining in step S151 that an in-focus state has been obtained, the CPU 121 displays the in-focus state on the display device 131 in step S155, and the process advances to step S157.

In step S157, the CPU 121 determines whether the shooting start switch is turned on. If the switch is not turned on, the CPU 121 maintains the shooting standby state in step S157. If the shooting start switch is turned on in step S157, the process advances to step S161 to execute shooting processing. The shooting start switch may be turned on when the user presses, for example, the release button fully.

FIG. 18 is a flowchart for explaining details of the shooting processing in step S161.

In step S163, the CPU 121 controls the opening amount and open/close timing of the shutter 102 via the shutter driving circuit 128, thereby performing exposure processing. As in a common procedure, automatic exposure control processing is executed in parallel to the focus detection processing to decide the f-number and shutter speed, although not specifically described above.

In step S165, the CPU 121 performs image read, that is, full pixel read for recording image generation via the image sensor driving circuit 124.

In step S167, the CPU 121 interpolates the lost pixels of the read image signal using the image processing circuit 125. The lost pixels include defective pixels generated in the manufacture of the image sensor 107 and focus detection pixels. As described above, the focus detection pixels have no R, G, and B color filters. They receive light from only parts of the exit pupil. Hence, image signals of the focus detection pixels are generated by interpolation based on the information of neighboring image-capturing pixels, like normal defective pixels.

In step S169, the CPU 121 causes the image processing circuit 125 to execute image signal processing so-called development processing such as color interpolation, γ correction, and edge enhancement of the image and image processing such as coding in accordance with settings.

In step S171, the CPU 121 records the captured image in the recording medium 133.

In step S173, the CPU 121 displays the captured image on the display device 131, and ends the shooting processing.

As described above, according to this embodiment, when arranging pairs of focus detection pixels having a pupil division function at some pixels included in the image sensor, pixels in each pair are arranged adjacent to each other, thereby lowering the focus detection error occurrence probability. Additionally, the pair of pixels is arranged at the positions of the R and B pixels adjacent to each other. This suppresses the influence on the image quality as compared to a case in which the pair of pixels is arranged at the positions of the G pixels.

The layouts of the first and second AF pixels are switched in two pairs of focus detection pixels, which are adjacent in the direction perpendicular to the pupil division direction and whose first and second AF pixels have boundaries at the same position. Two sets of image waveforms obtained from the two adjacent pairs of focus detection pixels are averaged or added. This further suppresses the focus detection error occurrence probability.

Second Embodiment

The second embodiment of the present invention will be described next. An image-capturing apparatus according to the second embodiment is the same as in the first embodiment except the layout of focus detection pixels in an image sensor 107. Only the layout of focus detection pixels will be described below as the characteristic feature of this embodiment.

Figure 19:
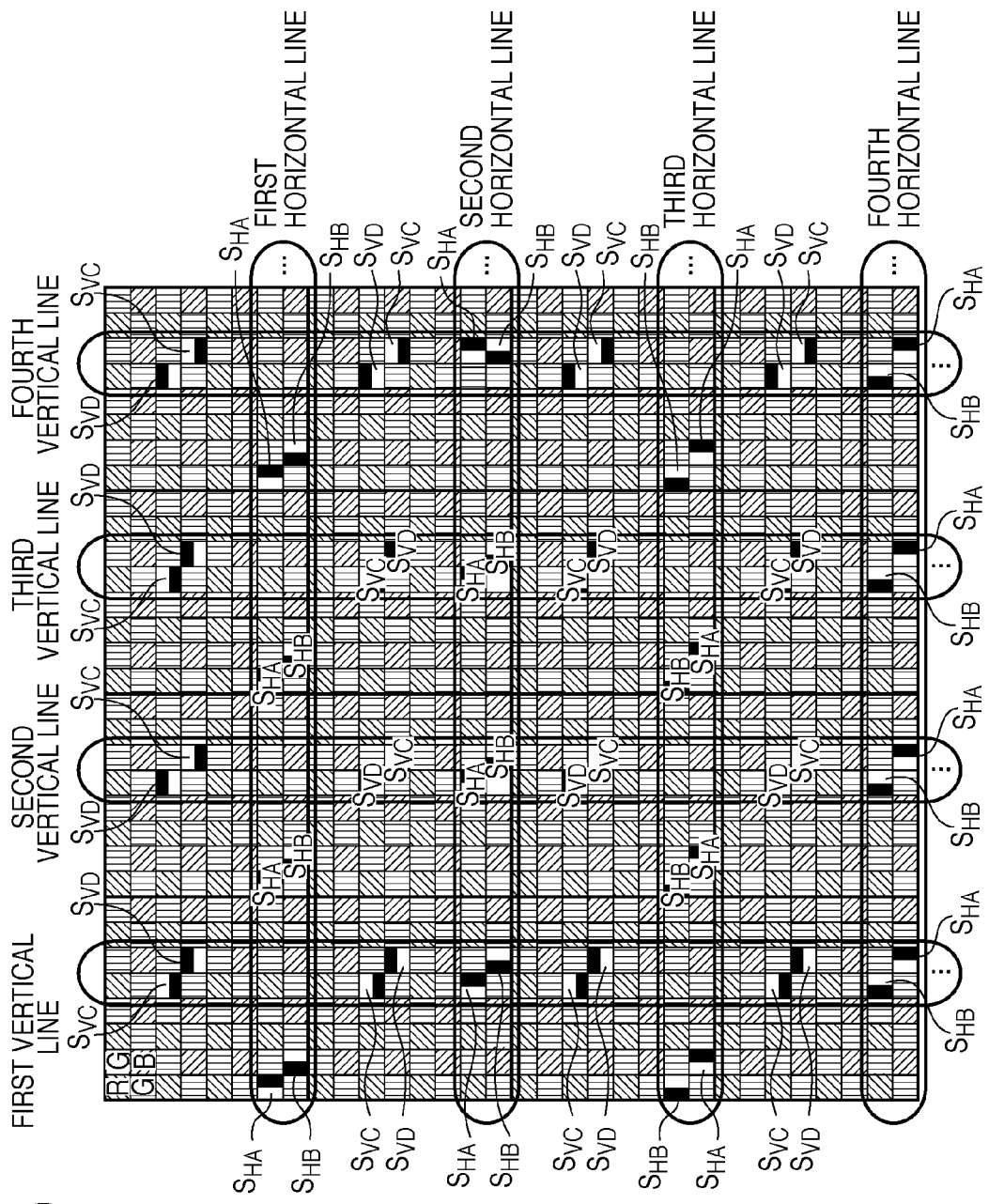
FIG. 19 is a view for explaining the layout rule of focus detection pixels in an image sensor according to the second embodiment of the present invention.

FIG. 19 is a view showing an example of layout of pairs of focus detection pixels in 4×4=16 blocks according to the second embodiment of the present invention.

In the first embodiment, the first pairs of focus detection pixels $S_{HA}$ and $S_{HB}$ to detect the phase difference in the horizontal direction and the second pairs of focus detection pixels $S_{VC}$ and $S_{VD}$ to detect the phase difference in the vertical direction are arranged in a square pattern. The first pairs of focus detection pixels $S_{HA}$ and $S_{HB}$ and the second pairs of focus detection pixels $S_{VC}$ and $S_{VD}$ are arranged while being shifted by a ½ pitch in the horizontal and vertical directions so that a staggered arrangement is obtained as a whole.

In the second embodiment, a plurality of lines in which a plurality of pairs of focus detection pixels having the same pupil division direction are arranged at an equal pitch in the pupil division direction are arranged in a direction perpendicular to the pupil division direction. The pairs of focus detection pixels in a line adjacent in the direction perpendicular to the pupil division direction are arranged while being shifted by a ½ pitch in the pupil division direction. For example, horizontal lines in which a plurality of first pairs of focus detection pixels $S_{HA}$ and $S_{HB}$ are arranged at an equal pitch in the horizontal direction are arranged in the vertical direction while being shifted by a ½ pitch in the horizontal direction alternately, as a characteristic feature. In two horizontal lines adjacent in the vertical direction, the horizontal pitch of the first pairs of focus detection pixels is ½. This improves the resolution of an image waveform in the vertical direction.

A set of first pairs of focus detection pixels $S_{HA}$ and $S_{HB}$ arranged on the uppermost block line will be referred to as a first horizontal line. A set of first pairs of focus detection pixels $S_{HA}$ and $S_{HB}$ of the second block line will be referred to as a second horizontal line. Similarly, the remaining sets of first pairs of focus detection pixels will subsequently be referred to as a third horizontal line and a fourth horizontal line, . . . . This is the same as in FIG. 15 described in the first embodiment.

As in the first embodiment, in each block of the first horizontal line, the first AF pixel $S_{HA}$ of the first pair of focus detection pixels is arranged at an address (1,0), and the second AF pixel $S_{HB}$ is arranged at an address (0,1).

In each block of the second horizontal line, the first AF pixel $S_{HA}$ of the first pair of focus detection pixels is arranged at an address (1,4), and the second AF pixel $S_{HB}$ is arranged at an address (0,5). That is, the first pair of focus detection pixels $S_{HA}$ and $S_{HB}$ in the second horizontal line is arranged at a position shifted by a ½ pitch in the horizontal direction with respect to the first horizontal line.

When both signals obtained by the AF pixels in the first horizontal line and those obtained by the AF pixels in the second horizontal line are used, image waveforms equivalent to those having a double resolution in the horizontal direction can be obtained.

The first pairs of focus detection pixels, that is, the first and second AF pixels included in the pairs of focus detection pixels arranged in the third horizontal line have boundaries at the same positions as in the first pairs of focus detection pixels in the first horizontal line, and are adjacent in the direction perpendicular to the pupil division direction.

Hence, in each block, the first AF pixel $S_{HA}$ of the first pair of focus detection pixels is arranged at the address (0,1), and the second AF pixel $S_{HB}$ is arranged at the address (1,0), as in the second horizontal line of the first embodiment. That is, the layouts of the first AF pixel $S_{VC}$ and the second AF pixel $S_{VD}$ are switched with respect to the first horizontal line.

Similarly, the first pairs of focus detection pixels, that is, the first and second AF pixels included in the pairs of focus detection pixels arranged in the fourth horizontal line have boundaries at the same positions as in the first pairs of focus detection pixels in the second horizontal line, and are adjacent in the direction perpendicular to the pupil division direction.

Hence, in each block of the fourth horizontal line, the first AF pixel $S_{HA}$ of the first pair of focus detection pixels is arranged at the address (0,5), and the second AF pixel $S_{HB}$ is arranged at the address (1,4). That is, the layouts of the first AF pixel $S_{VC}$ and the second AF pixel $S_{VD}$ are switched with respect to the second horizontal line.

In this embodiment, the boundary positions between the focus detection pixels $S_{HA}$ and $S_{HB}$ in the first horizontal line are the same as those in the third horizontal line. Hence, if the edge position of a subject is the same between the first and third horizontal lines, the phase shift between the A image waveform and the B image waveform occurs simultaneously in the first and third horizontal lines. The shift amounts are equal, and the shirts occur in opposite directions. The same relationship holds even between the second and fourth horizontal lines.

In this embodiment, two sets of image waveforms obtained from the two pairs of focus detection pixels, which are adjacent in the direction perpendicular to the pupil division direction and whose first and second AF pixels have boundaries at the same position, are averaged or added. This makes it possible to cancel out the shift between image waveforms when the edge of the subject image is located at the boundary between the AF pixels and further suppress the focus detection error occurrence probability.

In this embodiment, the positions of the first pairs of focus detection pixels in the second and fourth horizontal lines are shifted by a ½ pitch with respect to those in the first and third horizontal lines, thereby obtaining a staggered arrangement. This improves the resolution in the horizontal direction.

On the other hand, second pairs of focus detection pixels $S_{VC}$ and $S_{VD}$ for phase difference detection in the vertical direction are arranged in a square pattern, as in the first embodiment. This is because if the second pairs of focus detection pixels $S_{VC}$ and $S_{VD}$ are also arranged by shifting the pairs of focus detection pixels adjacent in the direction (horizontal direction) perpendicular to the pupil division direction by a ½ pitch in the pupil division direction (vertical direction), the focus detection pixels are nonuniformly distributed at some portions.

As described in the first embodiment, if the focus detection pixels $S_{HA}$, $S_{HB}$, $S_{VC}$, and $S_{VD}$ are distributed nonuniformly, the number of neighboring pixels necessary for interpolation processing may be insufficient, resulting in an adverse effect on the image quality. In this embodiment, to prevent this, the first pairs of focus detection pixels $S_{HA}$ and $S_{HB}$ are arranged while being shifted by a ½ pitch in every other horizontal line, whereas the second pairs of focus detection pixels $S_{VC}$ and $S_{VD}$ are arranged in a square pattern. This improves the resolution in the horizontal direction and suppresses image quality degradation caused by nonuniformly distributed focus detection pixels.

Note that in this embodiment as well, the layouts of the first and second AF pixels in each second pair of focus detection pixels $S_{VC}$ and $S_{VD}$ are switched in every other vertical line. More specifically, the layouts of the first and second AF pixels are switched in two pairs of focus detection pixels, which are adjacent in the direction perpendicular to the pupil division direction and whose first and second AF pixels have boundaries at the same position.

As shown in FIG. 19, in each block of the first vertical line, the first AF pixel $S_{VC}$ of the second pair of focus detection pixels is arranged at (5,4), and the second AF pixel $S_{VD}$ is arranged at (4,5), as in the first embodiment.

On the other hand, in each block of the second vertical line, the first AF pixel $S_{VC}$ of the second pair of focus detection pixels is arranged at (4,5), and the second AF pixel $S_{VD}$ is arranged at (5,4). That is, the layouts of the first AF pixel $S_{VC}$ and the second AF pixel $S_{VD}$ are switched with respect to the first vertical line.

In this embodiment as well, two sets of image waveforms obtained from the two pairs of focus detection pixels, which are adjacent in the direction perpendicular to the pupil division direction and whose first and second AF pixels have boundaries at the same position, are averaged or added. This makes it possible to cancel out the shift between image waveforms when the edge of the subject image is located at the boundary between the AF pixels and further suppress the focus detection error occurrence probability.

The focusing and shooting operations of the image-capturing apparatus using the image sensor 107 including pairs of focus detection pixels arranged in the above-described manner are the same as in the first embodiment, and a description thereof will not be repeated.

As described above, in the second embodiment, a plurality of lines in which a plurality of pairs of focus detection pixels having the same pupil division direction are arranged at an equal pitch in the pupil division direction are arranged in the direction perpendicular to the pupil division direction, as in the first embodiment. The pairs of focus detection pixels of one type in a line adjacent in the direction perpendicular to the pupil division direction are arranged while being shifted by a ½ pitch in the pupil division direction. That is, the pairs of focus detection pixels of the other type remain in a square pattern, whereas the pairs of focus detection pixels of one type have a staggered arrangement.

This makes it possible to improve the resolution of image waveforms obtained by the pairs of focus detection pixels of one type and accurately detect focus, in addition to the effects of the first embodiment.

Arranging only the pairs of focus detection pixels of one type in a staggered arrangement allows to suppress degradation in the quality of a captured image caused by nonuniformly distributed focus detection pixels.

In this embodiment, an example has been described in which the pitch of the pairs of focus detection pixels for phase difference detection in the horizontal direction is changed. However, the pitch of the pairs of focus detection pixels for phase difference detection in the vertical direction may be changed.

Third Embodiment

The third embodiment of the present invention will be described next. An image-capturing apparatus according to the third embodiment is the same as in the first embodiment except the layout of focus detection pixels in an image sensor 107. Only the layout of focus detection pixels will be described below as the characteristic feature of this embodiment.

Figure 20:
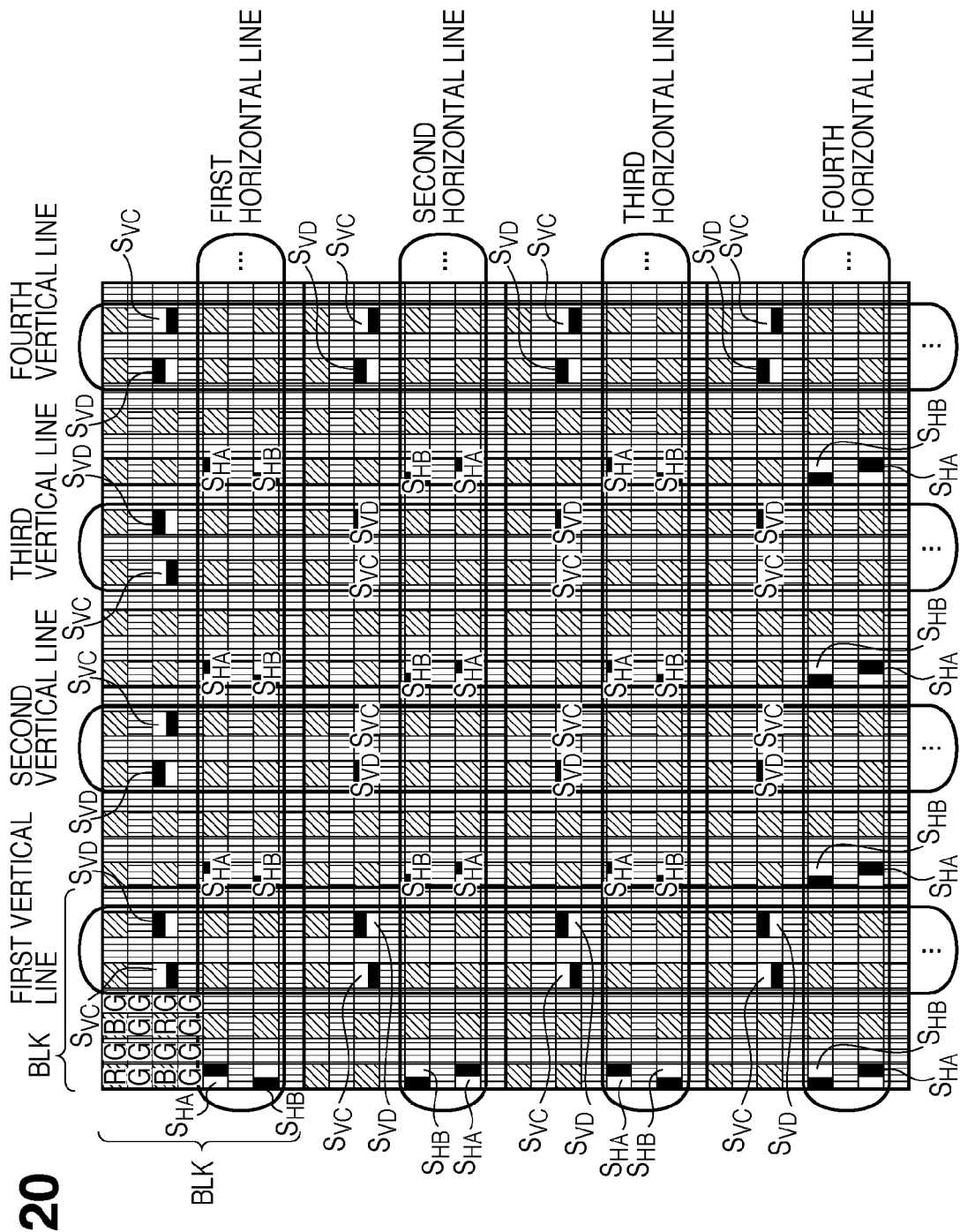
FIG. 20 is a view for explaining the layout rule of focus detection pixels in an image sensor according to the third embodiment of the present invention.

FIG. 20 is a view showing an example of layout of pairs of focus detection pixels in 4×4=16 blocks according to the third embodiment of the present invention.

In the first and second embodiments, an image sensor using color filters in a Bayer matrix has been described. More specifically, an image sensor has been described in which pixels having a G (green) spectral sensitivity are arranged as two diagonal pixels of one unit including 2×2=4 pixels, and pixels having R (red) and B (blue) spectral sensitivities are respectively arranged as two remaining pixels. The third embodiment is directed to the layout of pairs of focus detection pixels in an image sensor which adopts a pixel array including pixels having the G (green) spectral sensitivity in a higher proportion for the purpose of acquiring higher-resolution luminance information.

The color filters of the image sensor 107 of this embodiment will be described first. Twelve G pixels, two R pixels, and two B pixels exist in one unit made of 4×4=16 pixels. More specifically, the address of the pixel at the lower left corner of a block including 4×4=16 pixels is defined as (0,0). The address is defined such that as the pixel position moves rightward in the horizontal direction, the second term of the address is incremented by one, and as the pixel position moves upward in the vertical direction, the first term of the address is incremented by one. Based on this address rule, R pixels are arranged at (3,0) and (1,2), B pixels are arranged at (1,0) and (3,2), and G pixels are arranged at all the remaining 12 pixels.

In the above-described Bayer matrix, 50% of all pixels are G pixels. In the array of this embodiment, however, the proportion of G pixels is 75%. As described above, the output of the G pixel relatively largely contributes to luminance information and therefore largely affects the image quality as compared to the outputs of the B and R pixels. For this reason, in this embodiment, the proportion of G pixels is raised to acquire higher-resolution luminance information.

Referring to FIG. 20, a plurality of first pairs of focus detection pixels $S_{HA}$ and $S_{HB}$ provided on the uppermost block line in the vertical direction will be referred to as a first horizontal line; the second block line from the upper end as a second horizontal line; the third block line as a third horizontal line; and the fourth block line as a fourth horizontal line. A plurality of second pairs of focus detection pixels $S_{VC}$ and $S_{VD}$ provided on the leftmost block line in the horizontal direction will be referred to as a first vertical line; the second block line from the left end as a second vertical line; the third block line as a third vertical line; and the fourth block line as a fourth vertical line.

As in the first and second embodiments, image-capturing pixels are divided into blocks each formed from a square region having a predetermined size, and a first pair of focus detection pixels $S_{HA}$ and $S_{HB}$ and a second pair of focus detection pixels $S_{VC}$ and $S_{VD}$ are arranged in each block. In the third embodiment, a square region including 8×8 pixels is defined as one block, as in the first and second embodiments.

As for addresses representing pixel positions in a block, the address of the pixel at the lower left corner is defined as (0,0). The address is defined such that as the pixel position moves rightward in the horizontal direction, the second term of the address is incremented by one, and as the pixel position moves upward in the vertical direction, the first term of the address is incremented by one.

The layout rule of the first pairs of focus detection pixels $S_{HA}$ and $S_{HB}$ for phase difference detection in the horizontal direction will be described first using these addresses. In the first horizontal line, the first AF pixel $S_{HA}$ of each first pair of focus detection pixels is arranged at an address (3,0), and the second AF pixel $S_{HB}$ is arranged at an address (1,0).

As described above, to suppress image quality degradation, the focus detection pixels $S_{HA}$ and $S_{HB}$ are arranged at the positions of R and B pixels. The positions of the first pair of focus detection pixels $S_{HA}$ and $S_{HB}$ in the horizontal direction can be coincident as much as possible because they detect focus based on a contrast pattern in the horizontal direction. Additionally, as described above, the interval between the first AF pixel $S_{HA}$ and the second AF pixel $S_{HB}$ of the pair of focus detection pixels can be short.

To satisfy these conditions as much as possible, in the third embodiment, the first AF pixel $S_{HA}$ and the second AF pixel $S_{HB}$ are vertically arranged to make the horizontal positions match and also to be adjacent while avoiding the G pixels. This layout reduces focus detection errors generated when the first AF pixel $S_{HA}$ and the second AF pixel $S_{HB}$ are different pixels.

The horizontal positions of the first AF pixel $S_{HA}$ and the second AF pixel $S_{HB}$ of the first pair of focus detection pixels provided in each block of the first horizontal line match. If a subject image (e.g., vertical line) has a contrast pattern only in the horizontal direction, the first AF pixel $S_{HA}$ and the second AF pixel $S_{HB}$ always see the same pattern portion. Hence, no focus detection error is generated even by detecting focus using image waveforms obtained from different pixels.

However, when a subject image has a contrast pattern not only in the horizontal direction but also in the vertical direction, the first AF pixel $S_{HA}$ and the second AF pixel $S_{HB}$ see portions spaced part by two pixels in the vertical direction. This may generate focus detection errors a little. Especially when capturing a line tilted by 45°, the focus detection errors may be large.

To prevent this, in the third embodiment, the layouts of the first AF pixel $S_{HA}$ and the second AF pixel $S_{HB}$ in the second horizontal line are switched with respect to the first horizontal line, as in the first and second embodiments. More specifically, in the second horizontal line, the first AF pixel $S_{HA}$ of each first pair of focus detection pixels for phase difference detection in the horizontal direction is arranged at the address (1,0), and the second AF pixel $S_{HB}$ is arranged at the address (3,0). Image waveforms obtained from the first horizontal line and those obtained from the second horizontal line are averaged or added to generate a final set of image waveforms, thereby canceling out the focus detection errors.

As described above, the layouts of the first and second AF pixels are switched in two pairs of focus detection pixels, which are adjacent in the direction perpendicular to the pupil division direction and whose first and second AF pixels have boundaries at the same position. Image waveforms obtained from the two pairs of focus detection pixels adjacent to each other are averaged or added, thereby suppressing the focus detection error occurrence probability.

For a subject (e.g., vertical line) having a contrast pattern only in the horizontal direction, no focus detection error is generated in both the first and second horizontal lines even when the focus detection pixels $S_{HA}$ and $S_{HB}$ are formed from different pixels.

However, for example, when a line tilted by 45° is taken, focus detection errors are generated because the first AF pixel $S_{HA}$ and the second AF pixel $S_{HB}$ are different pixels spaced apart in the vertical direction. Even in this case, however, an edge of the line tilted by 45° simultaneously overlaps the boundaries in the pairs of focus detection pixels $S_{HA}$ and $S_{HB}$ in the first and second horizontal lines. Hence, the phase shift between the A and B image waveforms simultaneously occurs. The shift amounts are equal, and the shirts occur in opposite directions.

In the third embodiment as well, the image waveforms of lines adjacent in the direction perpendicular to the pupil division direction are averaged or added, thereby canceling the focus detection errors. This reduces focus detection errors generated when the first AF pixel to generate an A image waveform and the second AF pixel to generate a B image waveform are different pixels.

In the third horizontal line, the first AF pixel $S_{HA}$ and the second AF pixel $S_{HB}$ are arranged at the same addresses as in the first horizontal line. In the fourth horizontal line, the first AF pixel $S_{HA}$ and the second AF pixel $S_{HB}$ are arranged at the same addresses as in the second horizontal line. The layouts of the focus detection pixels $S_{HA}$ and $S_{HB}$ are switched even in the third and fourth horizontal lines, like the relationship between the first and second horizontal lines. For this reason, when image waveforms obtained from the two lines are averaged or added to generate final image waveforms, the focus detection errors can be reduced.

The layout rule of the pairs of second pair of focus detection pixels $S_{VC}$ and $S_{VD}$ for phase difference detection in the vertical direction according to this embodiment will be described next.

In the first vertical line, the first AF pixel $S_{VC}$ of each second pair of focus detection pixels is arranged at an address (5,4), and the second AF pixel $S_{VD}$ is arranged at an address (5,6). To suppress image quality degradation, the focus detection pixels $S_{VC}$ and $S_{VD}$ are arranged at the addresses of R and B pixels. The positions of the second pair of focus detection pixels $S_{VC}$ and $S_{VD}$ in the vertical direction can be coincident as much as possible because they detect focus based on a contrast pattern in the vertical direction. Additionally, as described above, the interval between the first AF pixel $S_{VC}$ and the second AF pixel $S_{VD}$ of the pair of focus detection pixels can be short.

To satisfy these conditions as much as possible, in the third embodiment, the first AF pixel $S_{VC}$ and the second AF pixel $S_{VD}$ of the second pair of focus detection pixels are horizontally arranged to make the vertical positions match and also to be adjacent while avoiding the G pixels. This layout reduces focus detection errors generated when the first AF pixel $S_{VC}$ and the second AF pixel $S_{VD}$ are different pixels.

If a subject (e.g., horizontal line) has a contrast pattern only in the vertical direction, no focus detection error is generated even by detecting focus using image waveforms obtained from different pixels, like the relationship between the first and second horizontal lines. However, when capturing, for example, a line tilted by 45°, focus detection errors may be generated.

To prevent this, in the third embodiment, the layouts of the first AF pixel $S_{VC}$ and the second AF pixel $S_{VD}$ in the second vertical line are switched with respect to the first vertical line, as in the first and second embodiments. More specifically, in the second vertical line, the first AF pixel $S_{VC}$ of each second pair of focus detection pixels for phase difference detection in the vertical direction is arranged at the address (5,6), and the second AF pixel $S_{VD}$ is arranged at the address (5,4). Image waveforms obtained from the first vertical line and those obtained from the second vertical line are averaged or added to generate a final set of image waveforms, thereby canceling out the focus detection errors.

Both the first pairs of focus detection pixels and the second pairs of focus detection pixels are arranged in a square pattern at the same pitch in the horizontal and vertical directions. The group of first pairs of focus detection pixels and the group of second pairs of focus detection pixels are shifted by a ½ pitch in the vertical and horizontal directions.

More specifically, when the first focus detection pixels $S_{HA}$ and $S_{HB}$ are arranged at the addresses (1,0) and (3,0), the second focus detection pixels $S_{VC}$ and $S_{VD}$ are arranged at the addresses (5,6) and (5,4). This reduced image quality degradation caused by nonuniformly distributed focus detection pixels.

The focusing and shooting operations of the image-capturing apparatus using the image sensor 107 including pairs of focus detection pixels arranged in the above-described manner are the same as in the first embodiment, and a description thereof will not be repeated.

As described above, in the third embodiment as well, when arranging pairs of focus detection pixels having a pupil division function at some pixels included in the image sensor, pixels in each pair are arranged to be close to each other as much as possible while avoiding the G pixels. This makes it possible to lower the focus detection error occurrence probability while suppressing image quality degradation even using an image sensor having a pixel array including G pixels in a higher proportion for the purpose of acquiring higher-resolution luminance information.

Additionally, the layouts of the first and second AF pixels are switched in two pairs of focus detection pixels, which are adjacent in the direction perpendicular to the pupil division direction and whose first and second AF pixels have boundaries at the same position. Image waveforms obtained from the two adjacent pairs of focus detection pixels are averaged or added. This further suppresses the focus detection error occurrence probability.

Fourth Embodiment

The fourth embodiment of the present invention will be described next. An image-capturing apparatus according to the fourth embodiment is the same as in the first embodiment except the layout of focus detection pixels in an image sensor 107. Only the layout of focus detection pixels will be described below as the characteristic feature of this embodiment.

Figure 21:
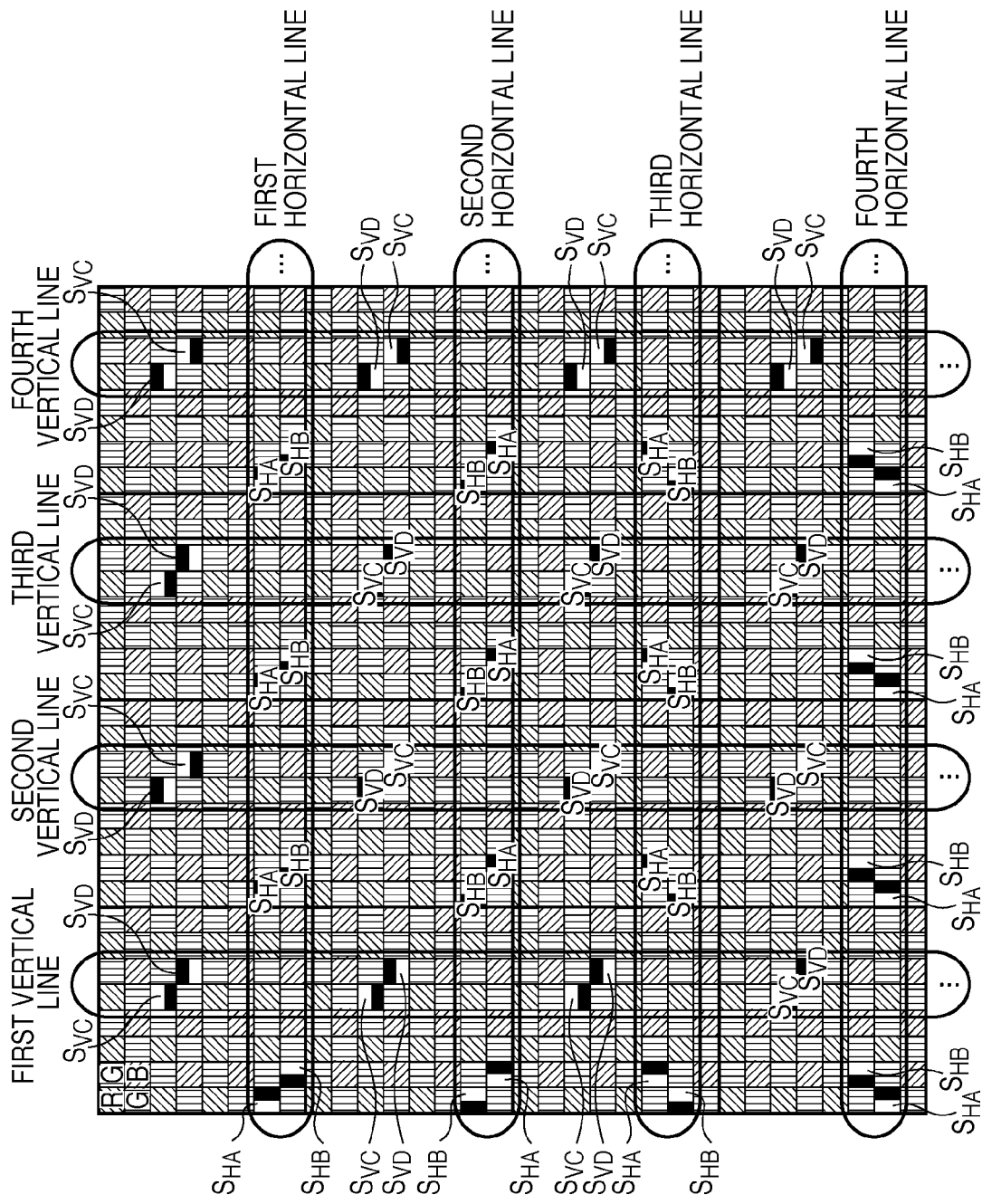
FIG. 21 is a view for explaining the layout rule of focus detection pixels in an image sensor according to the fourth embodiment of the present invention.

FIG. 21 is a view showing an example of layout of pairs of focus detection pixels in 4×4=16 blocks according to the fourth embodiment of the present invention.

In the first and second embodiments, the first and second AF pixels included in a pair of focus detection pixels are always arranged to be adjacent at an angle of −45°. In the fourth embodiment, the pairs of focus detection pixels are arranged such that the layout angle of the first and second AF pixels changes on every third line.

The layout rule of first pairs of focus detection pixels $S_{HA}$ and $S_{HB}$ will be described with reference to FIG. 21. In the first horizontal line, the first AF pixel $S_{HA}$ is arranged at an address (1,0), and the second AF pixel $S_{HB}$ is arranged at an address (0,1). In the second horizontal line, the layouts of the first AF pixel $S_{HA}$ and the second AF pixel $S_{HB}$ are switched, as in the first and second embodiments. That is, the first AF pixel $S_{HA}$ is arranged at the address (0,1), and the second AF pixel $S_{HB}$ is arranged at the address (1,0).

In the third horizontal line, the first AF pixel $S_{HA}$ is arranged at an address (2,1), and the second AF pixel $S_{HB}$ is arranged at the address (1,0). That is, the layout of the first horizontal line is inverted in the horizontal direction. Hence, the layout direction of the first AF pixel $S_{HA}$ and the second AF pixel $S_{HB}$ in the first horizontal line intersects that in the third horizontal line at a right angle.

Note that the focus detection pixels are not arranged at the positions of G pixels in this embodiment as well. For this reason, the third horizontal line is shifted by one pixel upward with respect to the blocks as compared to the first horizontal line. Hence, in this embodiment, the vertical pitch of the first pairs of focus detection pixels is not constant.

In the first horizontal line, the first AF pixel $S_{HA}$ and the second AF pixel $S_{HB}$ are arranged in the direction of −45°. For a subject (e.g., line tilted by −45°) having a contrast pattern in the direction of 45°, no focus detection error is generated even when the first AF pixel $S_{HA}$ and the second AF pixel $S_{HB}$ are different pixels. However, for a subject (e.g., line tilted by 45°) having a contrast pattern in the direction of −45°, focus detection errors are readily generated by the first AF pixel $S_{HA}$ and the second AF pixel $S_{HB}$ which are different pixels.

In the second horizontal line, the first AF pixel $S_{HA}$ and the second AF pixel $S_{HB}$ are arranged in the direction of 45°. For a subject having a contrast pattern in the direction of −45°, no focus detection error is generated even when the first AF pixel $S_{HA}$ and the second AF pixel $S_{HB}$ are different pixels. However, for a subject having a contrast pattern in the direction of 45°, the focus detection error occurrence probability is maximized.

That is, in a situation where focus detection errors readily become large in the first horizontal line, focus detection errors hardly occur in the third horizontal line. Conversely, in a situation where focus detection errors readily become large in the third horizontal line, focus detection errors hardly occur in the first horizontal line.

In this case, based on the information of the subject image obtained from the image-capturing pixels, focus detection is performed using image waveforms obtained from one of the first and third horizontal lines, which is determined to generate fewer focus detection errors, thereby reducing the focus detection errors.

In the fourth horizontal line as well, the first AF pixel $S_{HA}$ is arranged at the address (1,0), and the second AF pixel $S_{HB}$ is arranged at the address (2,1) so that the layout direction of the first AF pixel $S_{HA}$ and the second AF pixel $S_{HB}$ intersects that in the second horizontal line at a right angle. Based on the information of the subject image obtained from the image-capturing pixels, focus detection is performed using image waveforms obtained from one of the second and fourth horizontal lines, which is determined to generate fewer focus detection errors, thereby reducing the focus detection errors.

The vertical phase difference detection pixels are arranged in a square pattern, as in the first and second embodiments.

More specifically, in each block of the first and third vertical lines, a first AF pixel $S_{VC}$ of the second pair of focus detection pixels is arranged at an address (5,4), and a second AF pixel $S_{VD}$ is arranged at an address (4,5).

In each block of the second and fourth vertical lines, the first AF pixel $S_{VC}$ is arranged at the address (4,5), and the second AF pixel $S_{VD}$ is arranged at an address (5,4). That is, the of the first AF pixel $S_{VC}$ and the second AF pixel $S_{VD}$ are switched with respect to the first and third vertical lines. This reduces focus detection errors generated when the pair of focus detection pixels are formed from different pixels.

The focusing and shooting operations of the image-capturing apparatus using the image sensor 107 including pairs of focus detection pixels arranged in the above-described manner are the same as in the first embodiment except the operation of generating image waveforms for phase difference detection in step S137 (FIG. 17).

When generating image waveforms for phase difference detection, a CPU 121 detects the directions of edges using an image processing circuit 125 based on the information of a subject image obtained from the image-capturing pixels. From lines that cross the edges, the CPU 121 detects a set of lines on which the layout directions of the first and second AF pixels intersect at right angles. Out of the set of lines, image waveforms obtained from a line in which the edge direction intersects the pixel array direction at an angle close to 90° are used to generate image waveforms for phase difference detection. Alternatively, without detecting the set of lines, image waveforms obtained from a line which is supposed to have sufficient reliability for the edge direction may simply be used.

As described above, in the fourth embodiment, lines in which the layout directions of the first and second AF pixels intersect at right angles are provided in the focus detection pixel layout of the first embodiment. Focus detection is performed using image waveforms obtained from a line determined to be more reliable based on the information of a subject image. This further suppresses focus detection error occurrence.

Fifth Embodiment

The fifth embodiment of the present invention will be described next. In the first to fourth embodiments, the image sensor includes rectangular pixels arrayed in the horizontal and vertical directions. As a characteristic feature of the fifth embodiment, an image sensor having a so-called honeycomb structure in which octagonal image-capturing pixels are arrayed while being tilted at 45° is used.

Figure 22:
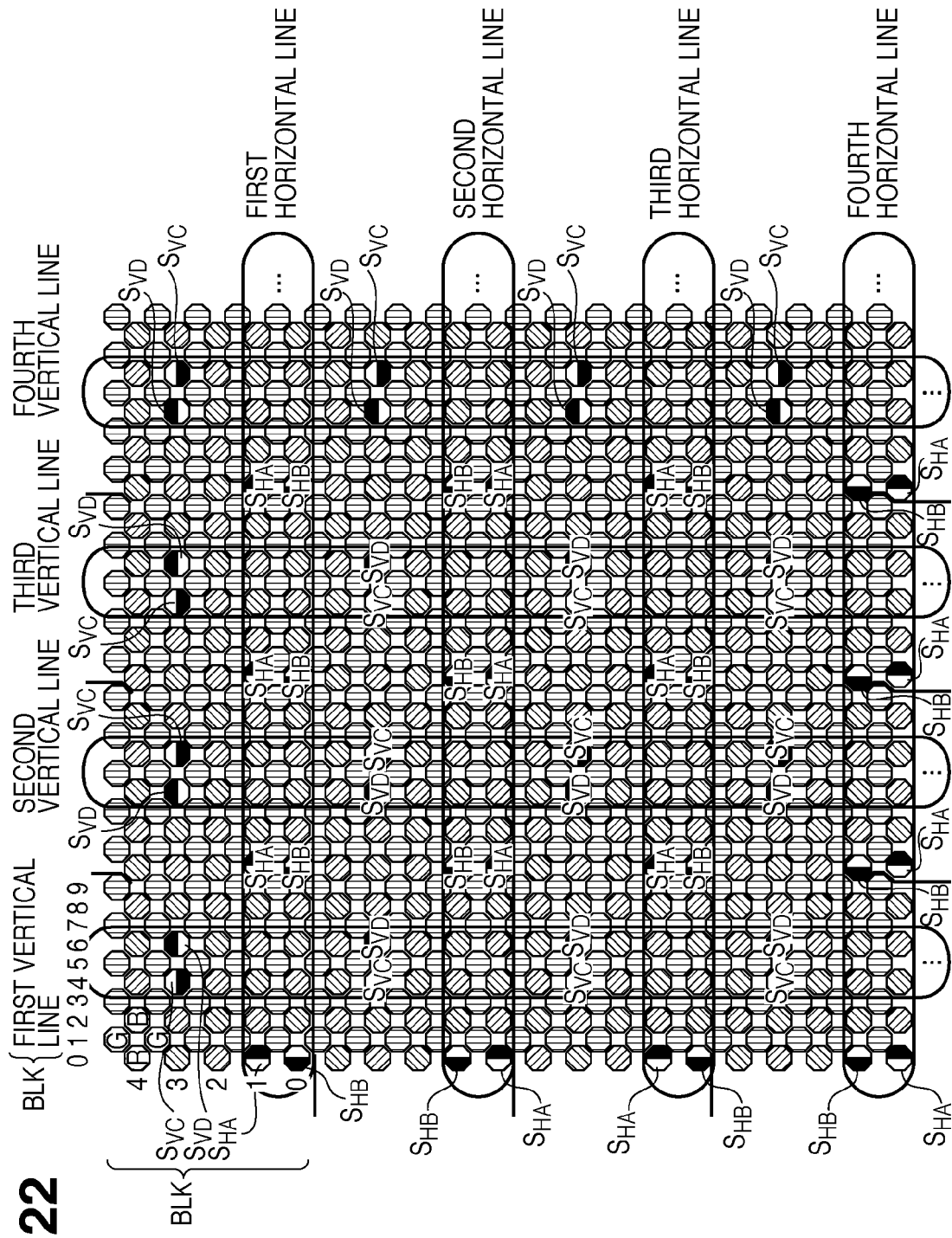
FIG. 22 is a view for explaining the layout rule of focus detection pixels in an image sensor according to the fifth embodiment of the present invention.

FIG. 22 is a view showing an example of layout of focus detection pixels in an image sensor 107 according to this embodiment.

In the image sensor 107 of this embodiment, pixels having a G (green) spectral sensitivity are arranged as two upper and lower pixels of one unit including 2×2=4 pixels tilted by 45°, and pixels having R (red) and B (blue) spectral sensitivities are respectively arranged as two, left and right pixels.

Referring to FIG. 22, a region having a size of 5 [pixel]×10 [pixel] is defined as a block. A total of four pixels, that is, a first pair of focus detection pixels $S_{HA}$ and $S_{HB}$ for phase difference detection in the horizontal direction and a second pair of focus detection pixels $S_{VC}$ and $S_{VD}$ for phase difference detection in the vertical direction are arranged in each block.

The plurality of first pairs of focus detection pixels $S_{HA}$ and $S_{HB}$ on the uppermost block line in the vertical direction will be referred to as a first horizontal line; the second block line from the upper end as a second horizontal line; the third block line as a third horizontal line; and the fourth block line as a fourth horizontal line. A plurality of second pairs of focus detection pixels $S_{VC}$ and $S_{VD}$ on the leftmost block line in the horizontal direction will be referred to as a first vertical line; the second block line from the left end as a second vertical line; the third block line as a third vertical line; and the fourth block line as a fourth vertical line.

The layout rule of the first pairs of focus detection pixels $S_{HA}$ and $S_{HB}$ will be described. In the first and third horizontal lines, the first AF pixel $S_{HA}$ is arranged at an address (1,0), and the second AF pixel $S_{HB}$ is arranged at an address (0,0).

In the second and fourth horizontal lines, the layouts of the first AF pixel $S_{HA}$ and the second AF pixel $S_{HB}$ are switched, as in the first and second embodiments. That is, the first AF pixel $S_{HA}$ is arranged at the address (0,0), and the second AF pixel $S_{HB}$ is arranged at the address (1,0).

In this embodiment as well, the first and second AF pixels are arranged to be adjacent in this way. The first AF pixel $S_{HA}$ and the second AF pixel $S_{HB}$ of each first pair of focus detection pixels for phase difference detection in the horizontal direction are arranged at the same position in the horizontal direction. They are arranged at the positions of R and B pixels while avoiding G pixels.

The second pair of focus detection pixels $S_{VC}$ and $S_{VD}$ for phase difference detection in the vertical direction will also be described. In the first and third vertical lines, the first AF pixel $S_{VC}$ is arranged at an address (3,4), and the second AF pixel $S_{VD}$ is arranged at an address (3,6). In the second and fourth vertical lines, the layouts of the first and second AF pixels are switched. That is, the first AF pixel $S_{VC}$ is arranged at the address (3,6), and the second AF pixel $S_{VD}$ is arranged at the address (3,4).

Image waveforms obtained from the first and third horizontal lines and those obtained from the second and fourth horizontal lines are averaged or added to generate image waveforms to be finally used for phase difference detection.

Additionally, image waveforms obtained from the first and third vertical lines and those obtained from the second and fourth vertical lines are averaged or added to generate image waveforms to be finally used for phase difference detection.

The focusing and shooting operations of the image-capturing apparatus using the image sensor 107 including pairs of focus detection pixels arranged in the above-described manner are the same as in the first embodiment, and a description thereof will not be repeated.

As described above, the present invention is also applicable to an image sensor having a honeycomb structure, and the same effects as in the first embodiment can be obtained.

More specifically, when arranging pairs of focus detection pixels having a pupil division function at some pixels included in the image sensor, pixels in each pair are arranged adjacent to each other, thereby lowering the focus detection error occurrence probability. Additionally, the pair of pixels is arranged at the positions of the R and B pixels adjacent to each other. This suppresses the influence on the image quality as compared to a case in which the pair of pixels is arranged at the positions of the G pixels.

The layouts of the first and second AF pixels are switched in two pairs of focus detection pixels, which are adjacent in a direction perpendicular to the pupil division direction and whose first and second AF pixels have boundaries at the same position. Image waveforms obtained from the two pairs of focus detection pixels adjacent to each other are averaged or added, thereby further suppressing the focus detection error occurrence probability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-179461, filed on Jul. 9, 2008, which is hereby incorporated by reference herein in its entirety.

The invention claimed is:

1. An image-capturing apparatus comprising:
an image sensor including a plurality of pixels which photoelectrically convert a subject image, a plurality of pairs of focus detection pixels to detect a focusing status of a lens, which forms the subject image, by phase difference detection being arranged in the plurality of pixels at a predetermined pitch, each pair of focus detection pixels including a first focus detection pixel and a second focus detection pixel; and
a detection unit that detects, based on a phase difference between a first image waveform and a second image waveform obtained from the first focus detection pixels and the second focus detection pixels of the plurality of pairs of focus detection pixels, respectively, the focusing status of the lens,
wherein in two adjacent pairs of focus detection pixels in a direction perpendicular to the phase difference direction, layouts of the first focus detection pixels and the second focus detection pixels are switched, the detection unit detects the focusing status of the lens using the first image waveform and the second image waveform obtained from the plurality of pairs of focus detection pixels in which the layouts of the first focus detection pixels and the second focus detection pixels are switched, and the detection unit generates the first image waveform either by averaging or adding one set of image waveforms obtained from the first focus detection pixels whose layouts are switched and generates the second image waveform either by averaging or adding one set of image waveforms obtained from the second focus detection pixels whose layouts are switched.

2. The apparatus according to claim 1, wherein the first focus detection pixel and the second focus detection pixel forming each pair of focus detection pixels are arranged at a distance shorter than the predetermined pitch.

3. The apparatus according to claim 1, further comprising color filters in which a plurality of colors including at least green are periodically arranged to limit a wavelength of incident light for each pixel of the image sensor, wherein the first focus detection pixel and the second focus detection pixel of each pair of focus detection pixels are arranged to be adjacent in pixels on which color filters of colors other than green are arranged.

4. The apparatus according to claim 1, wherein the plurality of pairs of focus detection pixels include at least one of:

a first pair of focus detection pixels including the first focus detection pixel and the second focus detection pixel whose opening positions are different in a horizontal direction of the image sensor, and a second pair of focus detection pixels including the first focus detection pixel and the second focus detection pixel whose opening positions are different in a vertical direction of the image sensor.

* * * * *